US012448005B2

(12) United States Patent
Valasek et al.

(10) Patent No.: US 12,448,005 B2
(45) Date of Patent: Oct. 21, 2025

(54) SECURE REMOTE COMMANDS TO AN AUTONOMOUS VEHICLE

(71) Applicant: GM Cruise Holdings LLC, San Francisco, CA (US)

(72) Inventors: Christopher Valasek, Pittsburgh, PA (US); Graziano Giuseppe Misuraca, New York, NY (US)

(73) Assignee: GM Cruise Holdings LLC, San Francisco, CA (US)

( * ) Notice: Subject to any disclaimer, the term of this patent is extended or adjusted under 35 U.S.C. 154(b) by 996 days.

(21) Appl. No.: 17/539,056

(22) Filed: Nov. 30, 2021

(65) Prior Publication Data

US 2023/0166769 A1    Jun. 1, 2023

(51) Int. Cl.
| | |
|---|---|
| *G06F 9/54* | (2006.01) |
| *B60W 60/00* | (2020.01) |
| *G06F 9/4401* | (2018.01) |
| *G07C 5/00* | (2006.01) |
| *H04W 4/44* | (2018.01) |

(52) U.S. Cl.
CPC ....... *B60W 60/0025* (2020.02); *G06F 9/4406* (2013.01); *G06F 9/547* (2013.01); *G07C 5/008* (2013.01); *H04W 4/44* (2018.02); *B60W 2554/4049* (2020.02); *B60W 2556/45* (2020.02)

(58) Field of Classification Search
None
See application file for complete search history.

(56) References Cited

U.S. PATENT DOCUMENTS

2022/0407647 A1* 12/2022 Baek .................... H04L 5/0053
2023/0047354 A1*  2/2023 Wang ................ B60W 50/0097

* cited by examiner

*Primary Examiner* — Craig C Dorais
(74) *Attorney, Agent, or Firm* — Honigman LLP; Matthew H. Szalach; Jonathan P. O'Brien

(57) ABSTRACT

There is disclosed an AV, comprising a vehicle motive system comprising hardware to operate the AV; and an AV controller to autonomously or semi-autonomously control the vehicle motive system, the AV controller comprising a hardware platform comprising a processor circuit and a memory, and instructions encoded within the memory to: provide an operating system (OS), including a utility set comprising a plurality of OS utility commands; provide a remote procedure server to accept incoming remote procedure requests from a host outside the AV; provide remote procedure stubs for a set of whitelisted commands, wherein the whitelisted commands comprise a subset of utility commands permissible to run on an AV with a production status; receive an incoming remote procedure request via the remote procedure server; map the incoming remote procedure request to a whitelisted command; and provide the remote procedure request to a remote procedure stub for the whitelisted command.

20 Claims, 13 Drawing Sheets

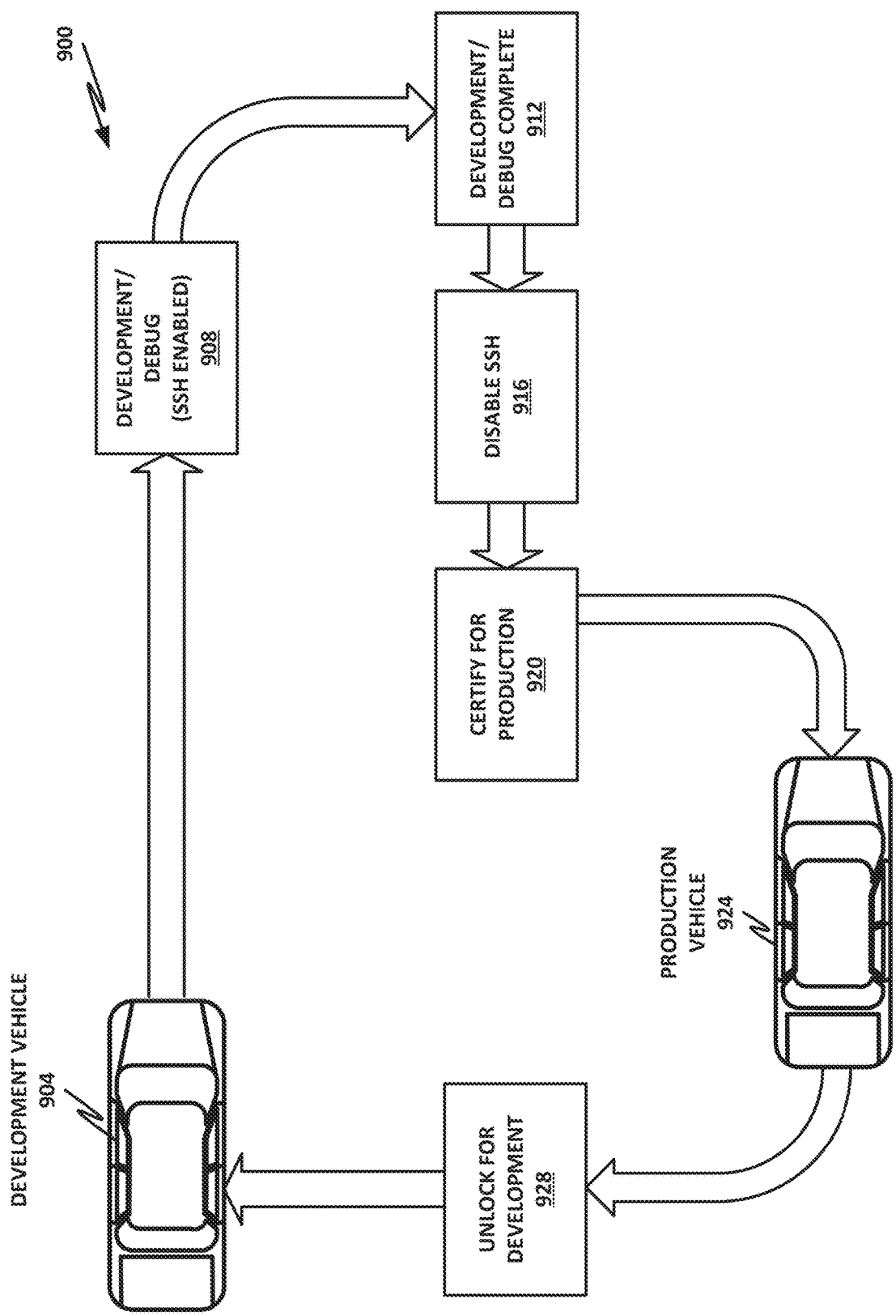

SECURE REMOTE COMMANDS TO AN AUTONOMOUS VEHICLE

FIELD OF THE SPECIFICATION

The present disclosure relates generally to autonomous vehicles (AVs), and more particularly, though not exclusively, to a system and method for providing secure remote commands to an AV.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to perceive the vehicle's environment accurately and quickly, including obstacles, signs, and traffic lights. The vehicles can be used to pick up passengers and drive the passengers to selected destinations. The vehicles can also be used to pick up packages and/or other goods and deliver the packages and/or goods to selected destinations.

SUMMARY

There is disclosed an AV, comprising a vehicle motive system comprising hardware to operate the AV; and an AV controller to autonomously or semi-autonomously control the vehicle motive system, the AV controller comprising a hardware platform comprising a processor circuit and a memory, and instructions encoded within the memory to: provide an operating system (OS), including a utility set comprising a plurality of OS utility commands; provide a remote procedure server to accept incoming remote procedure requests from a host outside the AV; provide remote procedure stubs for a set of whitelisted commands, wherein the whitelisted commands comprise a subset of utility commands permissible to run on an AV with a production status; receive an incoming remote procedure request via the remote procedure server; map the incoming remote procedure request to a whitelisted command; and provide the remote procedure request to a remote procedure stub for the whitelisted command.

BRIEF DESCRIPTION OF THE DRAWINGS

The present disclosure is best understood from the following detailed description when read with the accompanying FIGURES. In accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

FIG. 9 is a block diagram of selected elements illustrating an illustrative lifecycle of an AV.

DETAILED DESCRIPTION

Overview

Figure 1:
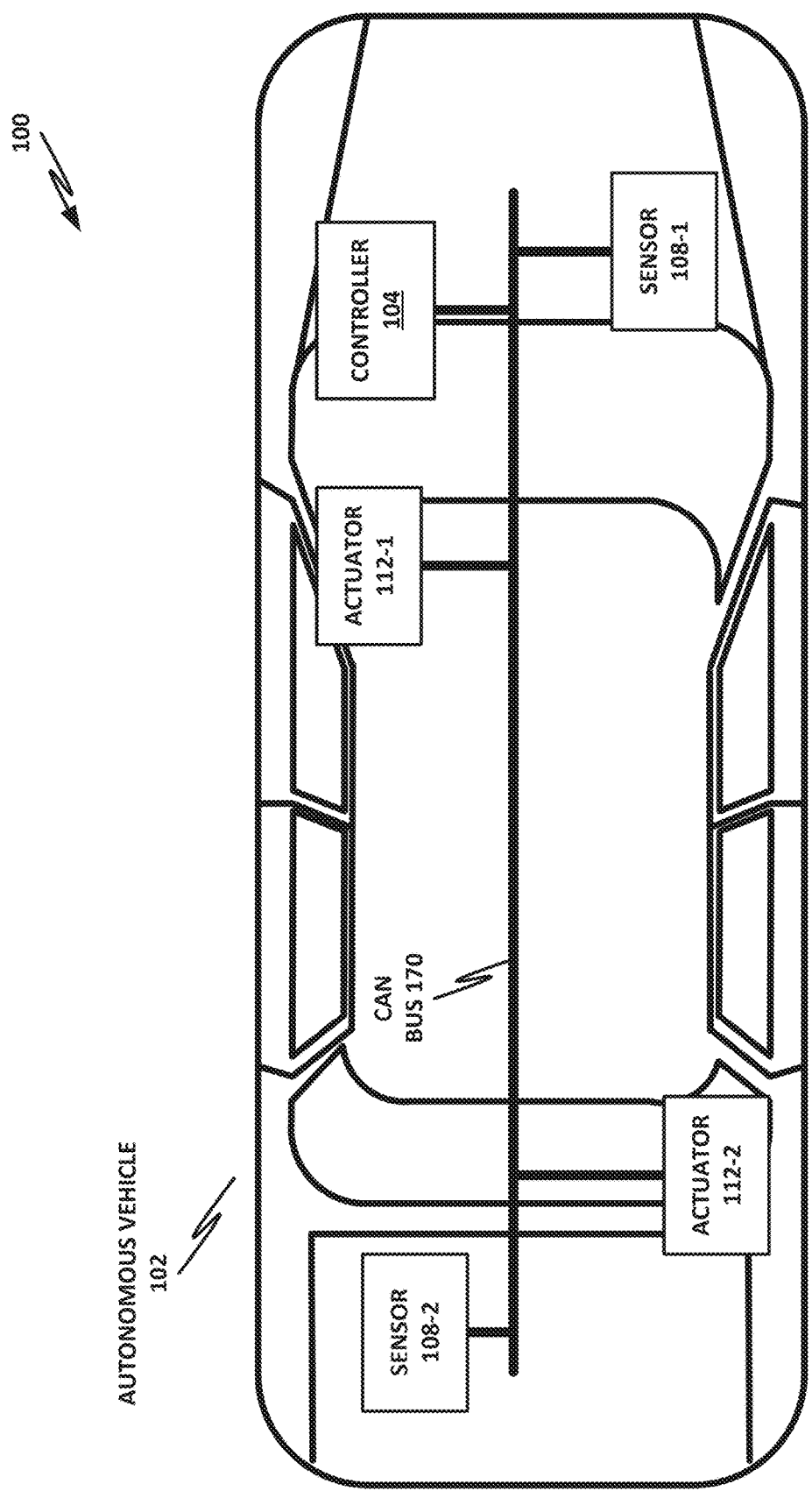
FIG. 1 is a block diagram illustrating an example autonomous vehicle.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In some cases, AVs may operate in different modes. For example, an AV in "development" mode may be subjected to testing, debugging, renovation, repair, or other operations that may be expected to change the configuration of the AV. However, once an AV is ready for production, its hardware and software configuration may be certified to a known state. In some cases, a digital signature may certify the hardware and/or software configuration of the AV. Making any changes to the hardware and/or software configuration may invalidate the digital signature, thus invaliding the "production" status of the AV.

As long as an AV is in a development or a testing configuration, it may be desirable or even necessary for human operators to have very low-level access to the system. The human operator who is performing the development and testing may need to be able to change the software configuration, add files, remove files, add software, remove software, change the boot order, or perform other operations that enable the development process. In an illustrative example, an AV may have a vehicle controller that runs an operating system (OS), such as a custom Linux operating system or a similar Unix-like operating system. For example, the vehicle controller may run Cruise OS, which is a customized Linux operating system.

In addition to the kernel, the operating system may also provide a number of OS utilities and programs that are used to configure the software. A "root" user or other administrator who has access to these commands may perform very powerful functions with unrestricted or nearly unrestricted access to software operations. During development and testing, it may be desirable or necessary to provide the developer or tester such access to the system.

In an embodiment, the vehicle controller may provide a remote login utility, such as secure shell (SSH), which uses one or both of password authentication and key-based authentication to identify the user. In some Unix-like operating systems, such as Cruise OS, the OS may use a concept of users and groups to control access to certain resources, such as by granting read or write access to resources based on the user's personal or group identification. In some Linux or Unix-like operating systems, the OS may also include "secure Linux" (SELinux) to provide contextual permissions to various resources.

An SSH session essentially provides the authenticated user unrestricted access to commands and system resources based on user or group authentication. However, in the case of production vehicles, it may be desirable to restrict remote access. If an operator is able to SSH into the machine when the AV has been certified for production, then that user may be able to make configuration changes that break the certification for production. Production certification may require a particular signed hardware and/or software configuration, and if changes are made to the certified hardware and/or software, then the vehicle loses its production-ready status. Thus, it may be undesirable to have an interactive shell available on production or production-ready vehicles. Furthermore, an interactive shell available to a remote attacker could result in unapproved and/or unpredictable changes to the behavior of the vehicle. In a production vehicle, it may be preferable to know that only approved and unmodified software is running on the vehicle.

However, even on a production vehicle, technicians and engineers may need to be able to debug or diagnose certain functions. For example, if a failure is encountered, a technician may need to identify a root cause so that the vehicle can be repaired and returned to operational status. In some cases, a malfunctioning vehicle may be returned to service without compromising its production status.

As an illustrative example, if a production vehicle is experiencing errors because one of its nonvolatile storage devices is full or nearly full, a technician may need to have the ability to determine what the problem is. If the technician could secure shell (SSH) into the machine, the technician could run a command, such as "df" (e.g., "disk free space," which provides a readout of used and free space on each block device) or a command, such as "lsblk-f" (e.g., list block devices (e.g., disks)) and their available free space).

Although this information is useful to the technician troubleshooting the vehicle, it may be preferable for production vehicles to stay as production vehicles. In other words, it may be preferable to provide an ecosystem in which the designation of a vehicle does not frequently switch between production and development, even during repair or maintenance operations. In some cases, an AV designer may intentionally make it relatively difficult to transition between production and development to minimize the chance for error and to ensure that a development vehicle, which may have less stringent security requirements, does not run in a production fleet.

Thus, it may be desirable to address the issue of remote commands, and in particular, arbitrary remote command execution and interactive logins. Arbitrary remote command execution may jeopardize a vehicle's production-ready status and may cause other difficulties. There may also be complications involved in changing vehicles from production to development and vice versa, which makes it desirable to keep a vehicle in one mode or the other as much as possible while minimizing switching between the modes.

In an embodiment, a security-reviewed, whitelisted, remote interface may be provided for executing preinstalled or preconfigured commands. This remote interface may satisfy developer and technician needs for running a certain subset of commands while preserving the nature of a production vehicle. In this ecosystem, it may be desirable to provide a mechanism for technicians to run diagnostic commands on production-configured vehicles, such as by issuing certain commands to the vehicle controller. However, it may be desirable to restrict the ability to run arbitrary commands on production-configured vehicles. Rather, it may be preferable to restrict the technician to the ability to run a certain subset of remote commands after authenticating to the system. Furthermore, it may be desirable to target commands to a specific vehicle and/or a specific controller on a particular vehicle.

For example, a particular technician may be authorized to work on one vehicle or fleet of vehicles but not on another vehicle or fleet of vehicles. Thus, the system may advantageously authenticate the user in the context of a particular vehicle or fleet and provide the user with a limited and whitelisted set of commands that can be used to diagnose problems or gather information about the vehicle without compromising the production status of the vehicle. In an example, the whitelisted subset of commands may be limited to read-only commands or, if some commands are provided that have both read and write functionality, those commands may be restricted so that only their read capabilities are available.

This may provide the technician with the ability to run certain useful commands without providing the technician a full SSH session. This may also prevent the technician from modifying the system settings remotely or from accessing arbitrary files on the vehicle. Rather, the technician may be limited only to specific whitelisted commands. Furthermore, the technician may be limited to specific vehicles, such as vehicles that are not presently in the field and that are presently being serviced or diagnosed so that even an authorized user does not have unrestricted access to the vehicle fleet.

In an illustrative example, the commands provided may be a carefully selected list of preinstalled, whitelisted commands that provide the technician with useful information without providing the technician the ability to modify the system. In some cases, when a vehicle enters production mode, the secure shell service or similar remote access service may be completely disabled for the duration of production mode. In other words, part of certifying a vehicle for production readiness may include disabling the secure shell or similar service.

In an example, in lieu of the SSH service on a production vehicle, the vehicle controller may provide a remote procedure call (RPC) service, such as the popular gRPC service. RPC is a known protocol for interprocess communication between devices. RPC abstracts out implementation details and allows remote hosts to call procedures as though they were local procedures. For example, a remote host may wish to issue the command "lsblk-f" to view available and used storage on block devices. If the host is provisioned with the correct RPC architecture, then the programmer may make an RPC call as follows (using JavaScript as an illustrative example):

//Connect to rpc server at URL
var client=rpc.server ("https://avgateway.io:443/");
//Call RPC procedure on local client var response=client.lsblk ("-f");
//Print the response to the Command Output Display Widget command_output_display.show (response);
RPC relies on an RPC client and an RPC server. The RPC client is a process on the host that makes the RPC request. The RPC client may be responsible for receiving RPC calls or requests, and providing them to an appropriate local "stub," which may be a lightweight program or library. Each RPC available on a calling device may have a corresponding stub, which receives the call and "marshals" appended parameters. This may include packing the appended parameters into a message packet, which can then be sent across the network to the remote host.

As illustrated herein, an AV in production mode may lack an interactive remote command shell. Instead, the vehicle controller may provide lsblk and other commands via RPC. To handle the RPC call, the vehicle controller may run a "daemon" process (known as an RPC server) that listens for RPC calls. When a remote host issues an RPC call to the vehicle controller, the RPC server identifies a corresponding RPC stub and forwards the request packet to the RPC stub. The RPC stub may then "unmarshall" the parameters, for example unpacking them from the provided network packet, and converting them into a format that is usable by the target process.

In this example, the target process may be the "lsblk" command, and the parameters may include the "-f" flag (short for "—fs," which directs the lsblk command to show information about file systems hosted on the block devices). The lsblk stub may build a terminal command from the RPC request and may also include logic to execute the appropriate command. For example, if the stub is written in C, it may include the following logic:
include <stdlib>
// Logic to unmarshall parameters and build
// a string named lsblk-cmd that has the content "lsblk-f"
// and that correctly redirects or pipes output so that the
// program can return the output in the RPC response
system (lsblk-cmd); //executes shell command The system may then execute the provided command, and redirect or pipe the output to a place where the stub can access it. Next, the stub may build a response packet, which may include for example the output of the lsblk command. The stub may send the response packet via the RPC server, which returns it to the RPC client on the remote host.

Once the RPC client on the remote host receives the RPC response packet, the lsblk stub on the remote host may provide a return value that includes the output of the command. Then, as illustrated above, the JavaScript program that made the RPC call can take appropriate action, such as displaying the result.

Advantageously, the calling process, the implementing process, and the stubs need not be written in the same language, and indeed need have no language in common. Rather, interface definitions identify the procedure to be called, the parameters that may be (or must be) provided, and the necessary data types for parameters. The code on either side of the transaction may thus remain agnostic of how things work on the other side of the transaction.

In an example, the system disclosed herein may use gRPC, which is a modern open source RPC architecture. Beneficially, gRPC streamlines some operations by providing a concept of "protocol buffers," which are language neutral and platform neutral interface definitions. A protocol buffer is generally stored in a ".proto" file, and provides definitions for calls and responses. For example, a protocol buffer for the lsblk command may appear as follows:
service LsblkService {
  rpc RequestLsblk (LsblkCommand) returns (LsblkResponse);
}
message LsblkCommand {
  string parameters=1;
}
message LsblkResponse {
  string terminal output=1;
}

A gRPC code generator may use this protocol buffer to build appropriate header files and stub libraries for any language that gRPC supports, which includes tens of languages (accounting for third-party implementations) as of this writing. Note, however, that in the case of a shell command, the implementation may be slightly different on the AV side.

Because shell commands are not necessarily a computing language, it may be simpler in some cases to manually implement stubs on the vehicle controller. Advantageously, this may also provide an opportunity to perform additional security checks, such as by parameterizing command-line arguments. This can prevent so-called "shell injection attacks," in which an attacker attempts to execute arbitrary commands on a remote host by injecting special characters (such as '&' or ';') into the command line. For example, if a web-based service provides remote commands, it may potentially be exploited with a command such as:
result=client.lslbk ("-f & malicious_command");
Such a call may be translated on the server as:
lsblk -f & malicious_command <return>
This would execute the malicious command on the shell. However, such attacks may be avoided by parameterizing command-line arguments. For example, instead of simply issuing the command "lsblk" to a shell, and then appending as a string literal whatever was provided, arguments may be parameterized at either the marshalling or unmarshalling stage (or both). Parameterizing the arguments breaks the provided arguments into discrete blocks, and provides each one as an atomic unit as part of a command line argument, similar to parameterizing argument in structured query language (SQL) queries to avoid SQL injection attacks. A parameterized version may instead execute as:
lsblk-f "& malicious_command"
This may simply return an error that "& malicious_command" is not recognized as a valid option for the lsblk command. Furthermore, parameterization may include validating arguments before anything is executed, so the command may simply be rejected as invalid before anything is run on the shell, or the "& malicious_command" portion may simply be discarded so that "lsblk-f" is all that is executed on the shell.

DETAILED DESCRIPTION OF THE DRAWINGS

A system and method for providing secure remote commands to an autonomous vehicle will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram 100 illustrating an example autonomous vehicle 102. Autonomous vehicle 102 may be, for example, an automobile, car, truck, bus, train, tram, funicular, lift, or similar. Autonomous vehicle 102 could also be an autonomous aircraft (fixed wing, rotary, or tiltrotor), ship, watercraft, hover craft, hydrofoil, buggy, cart, golf cart, recreational vehicle, motorcycle, off-road vehicle, three- or four-wheel all-terrain vehicle, or any other vehicle. Except to the extent specifically enumerated in the appended claims, the present specification is not Intended to be limited to a particular vehicle or vehicle configuration.

In this example, autonomous vehicle 102 includes one or more sensors, such as sensor 108-1 and sensor 108-2. Sensors 108 may Include, by way of illustrative and non-limiting example, localization and driving sensors such as photodetectors, cameras, RADAR, SONAR, LIDAR, GPS, inertial measurement units (IMUs), synchros, accelerometers, microphones, strain gauges, pressure monitors, barometers, thermometers, altimeters, wheel speed sensors, computer vision systems, biometric sensors for operators and/or passengers, or other sensors. In some embodiments, sensors 108 may include cameras implemented using high-resolution imagers with fixed mounting and field of view. In further examples, sensors 108 may include LIDARs implemented using scanning LIDARs. Scanning LIDARs have a dynamically configurable field of view that provides a point-cloud of the region intended to scan. In still further examples, sensors 108 includes RADARs implemented using scanning RADARs with dynamically configurable field of view.

Autonomous vehicle 102 may further include one or more actuators 112, such as actuator 112-1 and actuator 112-2. Actuators 112 may be configured to receive signals and to carry out control functions on autonomous vehicle 102. Actuators may include switches, relays, or mechanical, electrical, pneumatic, hydraulic, or other devices that control the vehicle. In various embodiments, actuators 112 may include steering actuators that control the direction of autonomous vehicle 102, such as by turning a steering wheel, or controlling control surfaces on an air or watercraft. Actuators 112 may further control motor functions, such as an engine throttle, thrust vectors, or others. Actuators 112 may also include controllers for speed, such as an accelerator. Actuators 112 may further operate brakes, or braking surfaces. Actuators 112 may further control headlights, indicators, warnings, a car horn, cameras, or other systems or subsystems that affect the operation of autonomous vehicle 102.

A controller 104 may provide the main control logic for autonomous vehicle 102. Controller 104 is illustrated here as a single logical unit and may be implemented as a single device such as an electronic control module (ECM) or other. In various embodiments, one or more functions of controller 104 may be distributed across various physical devices, such as multiple ECMs, one or more hardware accelerators, artificial intelligence (AI) circuits, or other.

Controller 104 may be configured to receive from one or more sensors 108 data to indicate the status or condition of autonomous vehicle 102, as well as the status or condition of certain ambient factors, such as traffic, pedestrians, traffic signs, signal lights, weather conditions, road conditions, or others. Based on these inputs, controller 104 may determine adjustments to be made to actuators 112. Controller 104 may determine adjustments based on heuristics, lookup tables, artificial intelligence, pattern recognition, or other algorithms.

Various components of autonomous vehicle 102 may communicate with one another via a bus such as controller area network (CAN) bus 170. CAN bus 170 is provided as an illustrative embodiment, but other types of buses may be used, including wired, wireless, fiberoptic, infrared, WiFi, Bluetooth, dielectric waveguides, or other types of buses. Bus 170 may implement any suitable protocol. for example, in some cases bus 170 may use transmission control protocol (TCP) for connections that require error correction. In cases where the overhead of TCP is not preferred, bus 170 may use a one-directional protocol without error correction, such as user datagram protocol (UDP). Other protocols may also be used. Lower layers of bus 170 may be provided by protocols such as any of the family of institute of electrical and electronics engineers (IEEE) 802 family of communication protocols, including any version or subversion of 802.1 (higher layer LAN), 802.2 (logical link control), 802.3 (Ethernet), 802.4 (token bus), 802.5 (token ring), 802.6 (metropolitan area network), 802.7 (broadband coaxial), 802.8 (fiber optics), 802.9 (integrated service LAN), 802.10 (interoperable LAN security), 802.11 (wireless LAN), 80.12 (100VG), 802.14 (cable modems), 802.15 (wireless personal area network, including Bluetooth), 802.16 (broadband wireless access), or 802.17 (resilient packet ring) by way of illustrative and nonlimiting example. Non-IEEE and proprietary protocols may also be supported, such as for example, InfiniBand, FibreChannel, FibreChannel over Ethernet (FCOE), Omni-Path, Lightning bus, or others. Bus 170 may also enable controller 104, sensors 108, actuators 112, and other systems and subsystems of autonomous vehicle 102 to communicate with external hosts, such as internet-based hosts. In some cases, autonomous vehicle 102 may form a mesh or other cooperative network with other autonomous vehicles, which may allow sharing of sensor data, control functions, processing ability, or other resources.

Figure 2:
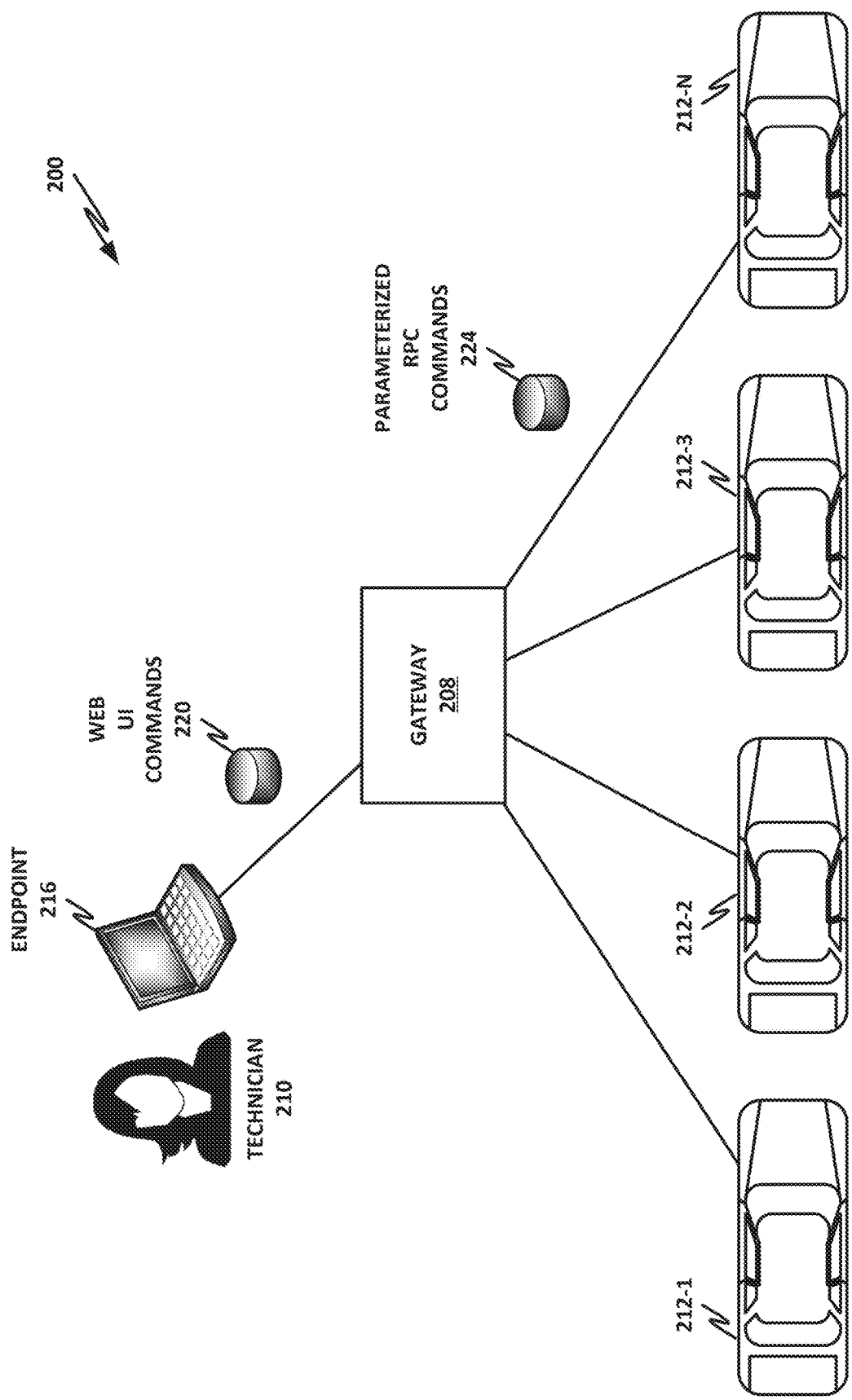
FIG. 2 is a block diagram of selected elements of an autonomous vehicle (AV) ecosystem.

Controller 104 may control the operations and functionality of autonomous vehicles 102, or one or more other autonomous vehicles. Controller 104 may receive sensed data from sensors 108, and make onboard decisions based on the sensed data. In some cases, controller 104 may also offload some processing or decision making, such as to a cloud service or accelerator. In some cases, controller 104 is a general-purpose computer adapted for I/O communication with vehicle control systems and sensor systems. Controller 104 may be any suitable computing device. An illustration of a hardware platform is shown in FIG. 2, which may represent a suitable computing platform for controller 104. In some cases, controller 104 may be connected to the Internet via a wireless connection (e.g., via a cellular data connection). In some examples, controller 104 is coupled to any number of wireless or wired communication systems. In some examples, controller 104 is coupled to one or more communication systems via a mesh network of devices, such as a mesh network formed by autonomous vehicles.

According to various implementations, autonomous vehicle 102 may modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

Autonomous vehicle 102 is illustrated as a fully autonomous automobile but may additionally or alternatively be any semi-autonomous or fully autonomous vehicle. In some cases, autonomous vehicle 102 may switch between a semi-autonomous state and a fully autonomous state and thus, some autonomous vehicles may have attributes of both a semi-autonomous vehicle and a fully autonomous vehicle depending on the state of the vehicle.

Controller 104 may communicate, for example, via CAN bus 170 with external hosts. As described herein, controller 104 may be configured in some modes to accept remote shell commands, such as via SSH or similar. However, in other modes, such as production modes, controller 104 may be configured to not provide an SSH or similar service. Rather, controller 104 may provide a smaller subset of whitelisted commands or versions of commands that enable a technician to perform maintenance and diagnostics on AV 102 without providing full shell access.

FIG. 2 is a block diagram of selected elements of an AV ecosystem 200. AV ecosystem 200 includes a plurality of AVs 212, namely AVs 212-1, 212-2, 212-3 through 212-N. As discussed herein, AVs 212 may be in production mode or in some other mode wherein it is preferable to not provide remote shell access to their controllers. Rather, AVs 212 may provide a smaller subset of whitelisted commands.

Because AVs 212 may operate on roadways and in other locations, they may not always have reliable network connections. Thus, it may not be practical to provide AVs 212 with a static IP address or other static means of reaching them. Rather, it may be more practical to provide a gateway 208 that mediates access to AVs 212. In an example, when an AV 212 gets a reliable network connection, it provides an outbound connection to gateway 208. Gateway 208 may include a vehicle multiplexer that it may use to maintain a list of currently connected AVs and routing information to contact those AVs. As the location and connectivity of AVs 212 change, gateway 208 may update its vehicle multiplexer. Thus, gateway 208 can provide a reliable network connection to the outside world and can regulate access to AVs 212.

In an example, a technician 210 operates an endpoint device, such as endpoint 216. In this illustration, endpoint 216 is shown as a laptop computer, but it may also be a desktop computer, a virtual machine, a virtual desktop, a dedicated hardware device, or some other mechanism for communicating over the network.

When technician 210 desires to perform diagnostics, maintenance, or other work on an AV 212, she may use endpoint 216 to connect to gateway 208. Gateway 208 may provide a web service, such as a webpage that provides a list of available commands that have been whitelisted for use on AVs 212. In some cases, the list of whitelisted commands could be on a per-AV basis, such as in the case where different commands are provided on different classes, models, or instances of an AV. Furthermore, different AVs may be in different modes, and thus it may be beneficial to provide different commands depending on the mode the AV is in. Thus, in some embodiments, RPC commands may be provided in lieu of a full shell even on development or debugging vehicles.

Technician 210 operates endpoint 216 to access the web server on gateway 208 and selects a desired command which is sent to gateway 208 as a web UI command 220.

Gateway 208 may include an RPC client that is configured to connect to RPC servers on the various AVs 212 and send parameterized RPC commands 224 to various AVs 212. Gateway 208 may parameterize the web UI command request and create an RPC packet which it may then deliver to the correct AV 212. Using the RPC infrastructure, the AV 212 may execute the command locally and provide results or output back to gateway 208. Gateway 208 may then provide the results back to endpoint 216 where technician 210 can view the results and perform diagnostics or other work.

Figure 3:
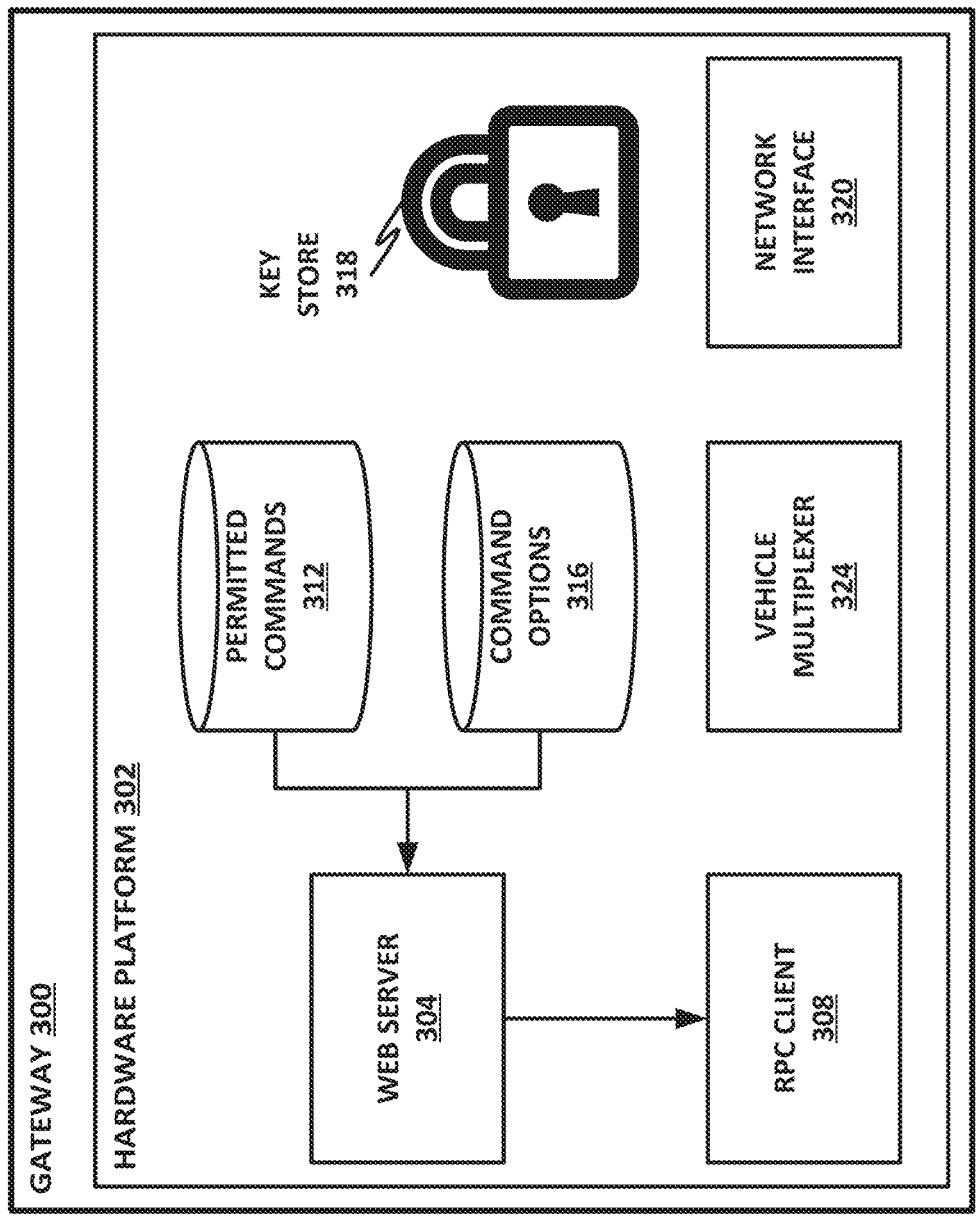
FIG. 3 is a block diagram of selected elements of a gateway.

FIG. 3 is a block diagram of a gateway 300. Gateway 300 is an illustrative embodiment of a gateway device that may be used according to the teachings of the present specification. In particular, gateway 300 could be an instance of gateway 208 as illustrated in FIG. 2.

Gateway 300 includes a hardware platform 302. Hardware platform 302 may be an instance of a hardware platform, such as the one illustrated in FIG. 12 below or some other appropriate hardware platform. Hardware platform 302 may also optionally provide a guest infrastructure, such as a virtualization infrastructure or containerization infrastructure. This may allow gateway 300 to run in a data center or in the cloud and may allow gateway 300 to provide certain micro-services and other functions. Thus, the illustration here of gateway 300 should be understood as a functional illustration and does not necessarily imply that all of the functions illustrated here are co-located on a single hardware device. The various functions could be provided or may be provided by micro-services, virtual machines, containers, or via some other infrastructure.

Gateway 300 provides a web server 304. Web server 304 may be configured to provide a graphical user interface, such as one similar to the GUI illustrated in FIGS. 10A and 10B. A different user interface could also be provided, and in some cases, web server 304 could itself be replaced with an RPC server that receives RPC commands from remote hosts. This could allow, for example, a technician to write a script or program that uses the RPC commands to perform batch diagnostics rather than manually executing each command individually. A technician may also be provided in some embodiments with a command-line like interface, which may be more familiar, although it may be restricted only to the whitelisted commands. Other architectures and infrastructure are also possible.

Web server 304 may have access to a whitelist of permitted commands 312. Permitted commands 312 may include a subset of all of the commands available on the AV and may in particular be biased towards commands that may be used for diagnostics and analysis. In some embodiments, permitted commands whitelist 312 may include exclusively read-only commands that cannot be used to change the configuration of the AV. Furthermore, in some cases, permitted commands 312 may include some commands that are not read-only in their full or standard form but have been configured via the RPC infrastructure to provide strictly read functionality.

For a user to access web server 304, the user may first need to authenticate to gateway 300. This enables gateway 300 to be a gatekeeper for access based on user credentials. It also allows gateway 300 to collect an audit trail of all users who have interacted with a particular vehicle, as well as when and how.

To this end, command options 316 may also be provided. This may be a database or list of permissible options for each command. Command options 316 may include flags, arguments, or other options that may be appended to a command invocation on the command line. However, command options 316 may not include all possible command line options that can be provided by the command. Rather, command options 316 may be deliberately limited to only a subset of command line options that are compatible with the modal operation of the vehicle. For example, if the vehicle is in production mode, then permitted commands 312 and command options 316 may be limited to commands and options that do not compromise the production status of the vehicle.

Gateway 300 may also include a vehicle multiplexer 324. Vehicle multiplexer 324 may make contact with vehicles as they move, such as by receiving incoming connections from vehicles when the vehicles receive a stable internet connection. Vehicle multiplexer 324 may thus keep track of which vehicles are currently available for receiving commands, the routing information for those vehicles, and other information about contacting the vehicles.

Network interface 320 may provide the network connection to the outside world and to the vehicles.

In an example, a key store 318 may be provided to maintain encryption keys, certificates, or other cryptographic information that may be used in communication. For example, when gateway 300 communicatively couples to an AV, the connection may be made via mTLS wherein both the server and the client exchange cryptographic certificates. This enables the gateway 300 and the AV to mutually authenticate to one another to ensure that AVs do not receive rogue commands from false gateways and to ensure that gateway 300 is not sending commands to false AVs.

This mTLS architecture may be useful in maintaining security on the AV. As described above, the AV may expressly disable outside shell access, such as via SSH. Although SSH has the disadvantage (in the context of a production AV) of providing full access to the shell, it has the advantage of having built-in and well understood security mechanisms. For example, SSH encrypts a connection between the server and the host and provides authentication that may include a username and password or that may also include, in addition or instead, an exchange of certificates. Thus, some embodiments of SSH provide authentication that is essentially equivalent to mTLS. Because some embodiments of the RPC architecture may not use SSH, other authentication means may be used to ensure authenticity, and mTLS may provide the kind of stable and well-understood security that is provided by the SSH program.

Furthermore, in some embodiments, it may be desirable to provide an expert mode to communicate with AVs, as illustrated in further detail in FIG. 11 below. Expert mode may be a rescue mode if an AV becomes stranded and can no longer get to a desired location. Expert mode may enable an outside computer or human user to provide directives to the AV to help ensure that the AV safely reaches its destination.

Because expert mode provides such open access to the control mechanisms of an AV, it may be preferable to ensure a highly secure connection. In an embodiment, expert mode messages are signed with a private key that may be maintained off-site from gateway 300. For example, the private key may be stored in a secure vault at a central location. Thus, key store 318 of gateway 300 may not have the private key used to sign expert mode messages. Rather, expert mode operators may receive an authorization token after performing a multifactor authentication with the centralized vault that includes the private key. This token may be provided to the vault to prove that the operator is authorized to sign expert mode messages, and in some embodiments, an additional message may be sent to the central authority with a signed message to ensure that the session is still valid. An AV in operation may dynamically fetch any certificates needed upon boot up, and those certificates may be used to verify expert mode messages, such as via asymmetric cryptography.

In an embodiment, the private key used to sign expert mode messages may never leave the centralized vault and may be used for signing by authenticated users. The public key may be dynamically fetched from the vault by the vehicle controller secret service and stored only in volatile memory so that the public key is not maintained across reboots.

Public keys may be generated inside the vault of the centralized service, and signing may take place inside the server of the centralized service as well. Expert mode terminals may authenticate with the vault and receive an authorization token.

A TLS tunnel may then be made from the expert mode terminal to the centralized service. This may be established for sending messages.

If a request comes in from an AV for expert help, the request may append a nonce value generated by the AV. The client may append the nonce value and the signature to each message, increasing the nonce value by one for each message. The client may use HTTPS calls appended to the message and authentication tokens to sign the message.

The server may receive messages from clients for processing and send the messages to the AV.

The AV may receive the expert mode server public keys in volatile memory, such as by retrieving it from the centralized vault upon bootup. The AV validates messages using the expert mode keys. An invalid nonce or an invalid signature may result in a rejected expert mode message and a security event, such as a notification to an administrator. Valid messages may be passed up the stack to subsequent expert mode functionality.

In an embodiment, expert mode terminals are kept separate from corporate networks to limit their ability to interact with the outside world. For example, VLANs may be used to isolate machines to a specific logical network while using whitelist to ensure the only certain house are directly accessible from expert mode terminals. The whitelist may be maintained in the vault server and by the central authority.

Expert mode terminals may be commissioned by IT professionals and approved by security professionals to ensure that all nonessential software is removed and all security related features are enabled.

Expert mode terminals may be required to authenticate to the vault and to the expert mode server before being able to service any help request. A combination of employee credentials and hardware second-factor authentication may be used to authenticate users. Both the vault service and the expert mode server may be responsible for logging authentication failures and alerting the security team in the event of malicious activity, such as multiple failed logins.

Terminals may authenticate directly to the centralized service after obtaining a vault token. This may be required before the terminal is able to service any sessions. The server may be in charge of validating the token received from the vault. The vault may require a second factor of authentication, which may include a hardware key that is not permitted to be removed from the expert mode service facility. Only after a terminal has authenticated may it begin servicing requests.

In an embodiment, the expert mode user may use lightweight directory access protocol (LDAP) credentials to authenticate to the vault. The vault may require expert mode terminals to provide a second factor for authentication, such as via an out-of-bound text message or a hardware token. Expert mode terminals may then establish a session that is valid for a time, such as eight hours, at which point the signing key may expire. The central authority may authenticate expert mode messages sent to it by accessing the client authentication token and using the API to check that the token is valid within the vault.

Gateway 300 may provide an RPC client 308, which may be used to communicatively couple to one or more AVs and to provide RPC commands received from the technician. RPC client 308 may include the appropriate interface definitions and stubs for marshaling parameters and sending RPC commands to the AV. RPC client 308 may also receive RPC responses from the AV.

Figure 4:
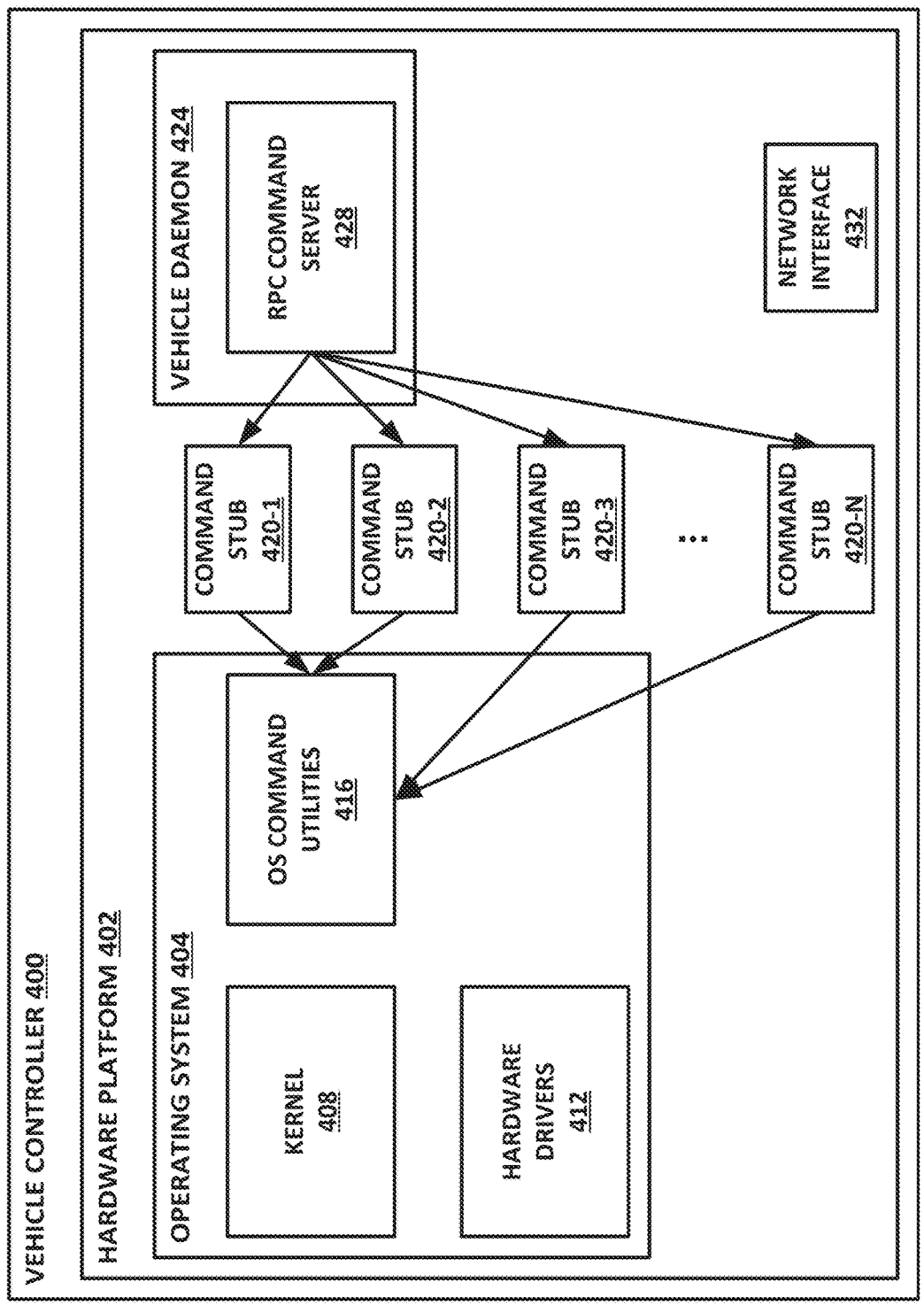
FIG. 4 is a block diagram of selected elements of a vehicle controller.

FIG. 4 is a block diagram of selected elements of a vehicle controller 400. Vehicle controller 400 may be the main controller for the AV or may be a part thereof. Only selected elements are illustrated herein to focus on novel aspects of the current specification.

Vehicle controller 400 includes a hardware platform 402. Hardware platform 402 may be an instance or an embodiment of a hardware platform as illustrated in FIG. 11 below or a different hardware platform.

Vehicle controller 400 runs an operating system 404. Operating system 404 may be an embedded or real-time operating system. In an illustrative example, operating system 404 may be the Cruise OS, which is a custom Linux operating system running on a modified Linux kernel.

Thus, operating system 404 includes kernel 408 and hardware drivers 412. Hardware drivers 412 enable communication with hardware devices, including with actuators, sensors, transducers, and other subsystems. Hardware drivers 412 also provide a connection to network interface 432, which enables vehicle controller 400 to communicate with an outside network.

Operating system 404 may include a number of OS commands and utilities 416. This may include, for example, the standard GNU Linux utilities or a set of standardized POSIX utilities. OS command utilities 416 may provide various functionality to operating system 404. When in a debug or development mode, it may be desirable to provide unfettered access to OS command utilities 416 so that the designer or debugger can configure the system and test various configurations.

However, in the case of a production vehicle, it may be preferable to limit the access to OS command utilities 416.

Vehicle controller 400 may provide a vehicle daemon 424. Vehicle daemon 424 may be a service that communicates with a gateway device, such as gateway 300 of FIG. 3 or gateway 208 of FIG. 2. Vehicle daemon 424 may communicate with the gateway using MTLS, such as by using session registration key data and certificates that have been provisioned to vehicle controller 400.

Vehicle daemon 424 may be configured to receive diagnostic commands as received from a technician, such as technician 210 of FIG. 2. Vehicle daemon 424 can convert these diagnostic commands into local queries. These could include hardware specific queries or queries within vehicle daemon 424.

Note that, in some cases, remote commands may not map directly one-to-one to specific commands provided by OS command utilities 416. Thus, vehicle daemon 424 may provide system-level queries and package the results for consumption in a web console.

Vehicle daemon 424 may provide an RPC command server 428, which may include a gRPC API service.

Note that, in some existing systems, a vehicle daemon may already have the ability to receive gRPC calls from a gateway. However, it may not be possible to reach the gateway directly during normal use. Thus, vehicle daemon 424 may provide a reverse connection that is established from vehicle daemon 424 to the gateway, which the gateway can then use to send requests to vehicle daemon 424.

In an embodiment, the gateway may maintain a special endpoint for remote commands, which may be provided specifically within the web UI. Communication between vehicle daemon 424 and the gateway may be authenticated via MTLS or some other equivalent, strong authentication mechanism. This may allow both parties to verify the others' identity.

In an embodiment, vehicle daemon 424 may be configured to execute remote commands only when network interface 432 is connected to a particular network, such as a Wi-Fi network provided in a service garage. This may ensure that arbitrary commands cannot be executed on the AV while it is in operation. Any command sent to the vehicle while the vehicle is not connected to the appropriate network may return an error to the client. The error may then be returned to the user so that the user will be aware of the situation.

Furthermore, some commands may have a restriction that they cannot be run when vehicle daemon 424 is running certain types of activities. These activities may be high priority activities that should not be interrupted. This can help to ensure that remote commands sent to vehicle controller 400 do not interrupt important tasks in progress.

In an embodiment, vehicle daemon 424 will perform both the check of whether the vehicle is connected to the appropriate network and whether any activity tasks are running. This may be implemented as middleware around the gRPC service, which provides an opportunity to inspect and deny a request before passing the request on to the call handler.

Currently, gRPC does not provide a mechanism to wrap a middleware around a single service. Thus, in some embodiments, it may be necessary to install the middleware around the entire gRPC server. An illustrative design may combine a GrpcAdapter service and remote command service into one server. Thus, the middleware may also wrap the GrpcAdapter calls. Because some restricted filters will be command-specific (e.g., allowing only certain commands to run when an activity is in progress), it may be desirable to implement command filtering. In that case, the Wi-Fi check may apply only to commands that are implemented by the remote commands service.

RPC command server 428 may provide the implementation of the command service. This may include a whitelist of commands that can be run, along with logic for determining when those commands can be run and under what circumstances. RPC command server 428 may be tasked with ensuring that secure commands will not alter the state of the vehicle. It may also ensure that commands will run only when connected to the appropriate network, such as a garage Wi-Fi network. In some cases, secure commands may be whitelisted without user-supplied arguments. Secure commands with arguments may have the arguments hardcoded within the diagnostic service.

In various embodiments, RPC command server 428 may receive requests to run certain commands on vehicle controller 400. RPC server 428 may communicatively couple to a plurality of command stubs, such as command stub 420-1, command stub 420-2, command stub 420-3 through command stub 420-N. Command stubs 420 may communicatively couple with OS command utilities 416, such as by a system or shell external command provided by a programming language. They could also communicate via files, named processes, pipes, or some other mechanism. When RPC command server 428 receives a command, authenticates the command, and ensures that the command is whitelisted and available, it may pass the command to the appropriate command stub 420. The command stub 420 may then execute the command with the appropriate command line arguments. OS command utilities 416 may return the output to command stub 420, which may return the output to RPC command server 428. RPC command server 428 may then return the output to the gateway, which may return the output to the requesting device.

To access vehicle controller 400 under permissible circumstances, a technician may use her ordinary workflow to log in to the web interface. She may be provided with a separate drop-down that exists for each vehicle that may list available commands for that vehicle. She may then select a command and run the command.

When the gateway receives the command request, it may translate the command request into an RPC request, which it may then send to vehicle controller 400. Vehicle controller 400 may receive the RPC request via RPC command server 428. RPC command server 428 may authenticate the command and execute the command as described.

In some cases, RPC command server 428 may return a relatively large blob of data, such as a/VAR/log output. In that case, the web UI may provide an option for the technician to download the content.

Several illustrative commands may provide an example of a command service. This list should be understood to be non-exhaustive and also non-required. Rather, this may provide a list of commands that may be useful in some contexts. Some commands, such as sysctl, inherently pose greater risk than others. It may be desirable to provide technicians with the tools to properly diagnose issues while maintaining tight security controls. Thus, the number of available commands may be smaller in some deployments. Furthermore, other commands may be added as necessary.

By way of illustrative example, the following commands may be provided:
General
  dmesg
  top
  stress-ng
  iptables-vnxL
  free
  sysctl
  setpci
  fsck
  lspci
  lscpu
  ipmitool (ipmitool may be heavily restricted (whitelisted commands) and its few allowed functions are available through websrv).
Disk/SSD monitoring:
  lsblk
  smartctl
Network monitoring:
  ping
  tcpdump In some embodiments, certain operations or activities may expressly not be supported. For example, these unsupported activities may provide more detailed access than may be desirable on a production device. Performing these actions may instead require changing the vehicle controller 400 to development mode. This includes, for example, shell access (telnet/SSH), transfer of files to or from the vehicle controller, update of an FPGA camera gateway, ROS utilities, accessing device webpages, and removing map caches.

In some embodiments, RPC command server 428 may be configured along with the gateway to provide additional features. For example, an embodiment may provide token authentication. Another embodiment may provide a terminal-like interface. Yet another embodiment may provide various log files.

Figure 5:
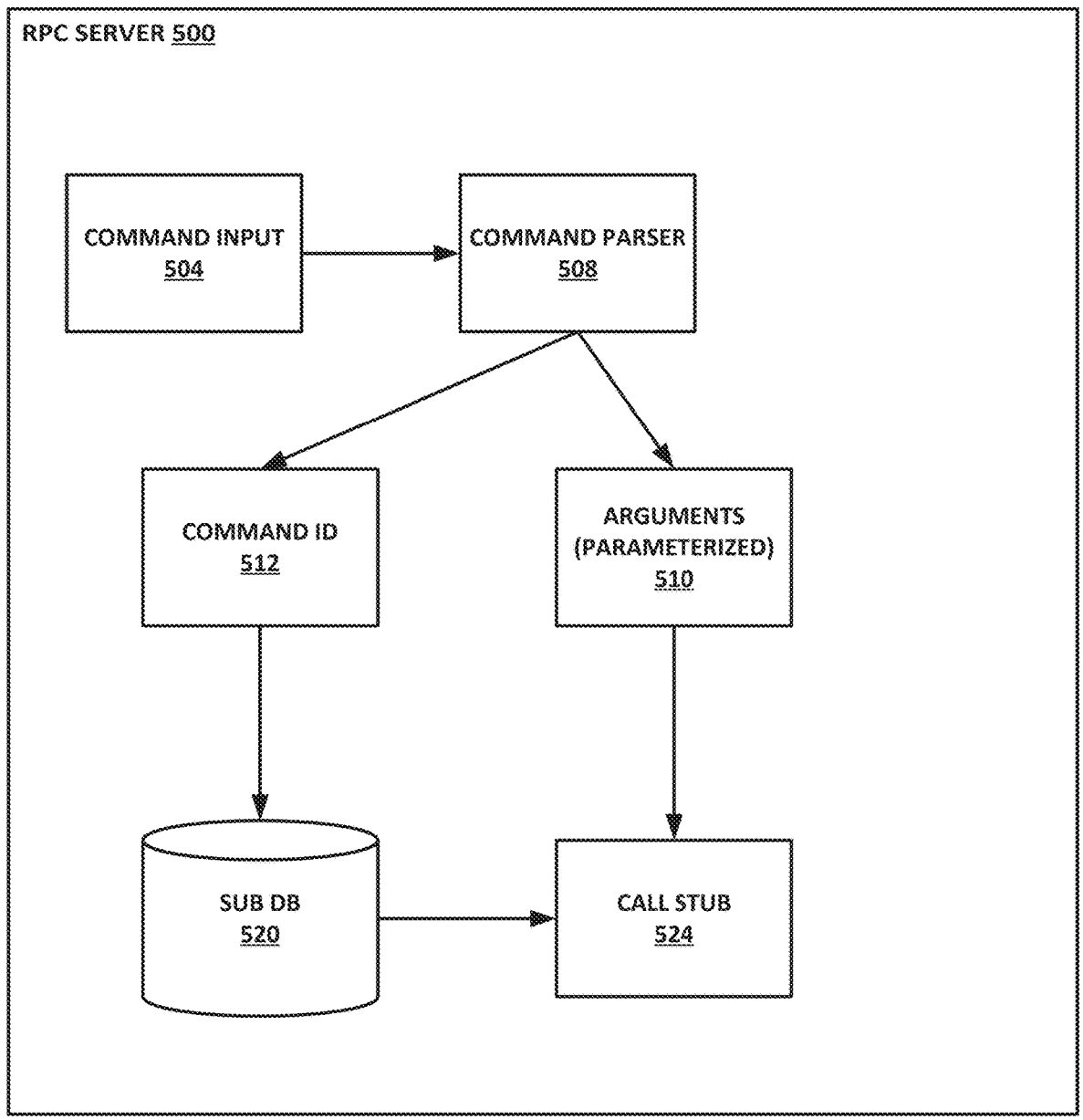
FIG. 5 is a block diagram of selected elements of a remote procedure call (RPC) server.

FIG. 5 is a block diagram of selected elements of an RPC server 500. For example, RPC server 500 may be an example or an embodiment of RPC command server 428 of FIG. 4.

By way of illustration, RPC server 500 may receive a command input 504. Command input 504 may be provided to a command parser 508. Command parser 508 may be configured to identify a portion of command input 504 that represents the base command or commands and to separate this from arguments which may or may not already be parameterized.

In block 512, RPC server 500 may operate command parser 508 to extract a command ID 512 from command input 504. This may be, for example, the command line name of the command. Command parser 508 also extracts arguments 510 which may or may not already be parameterized.

RPC server 500 may use command ID 512 to query a stub database 520 to determine an appropriate stub to handle the RPC command. A stub ID and the parameterized arguments 510 may be passed to block 524, which calls the appropriate stub and causes the command to be executed.

Figure 6:
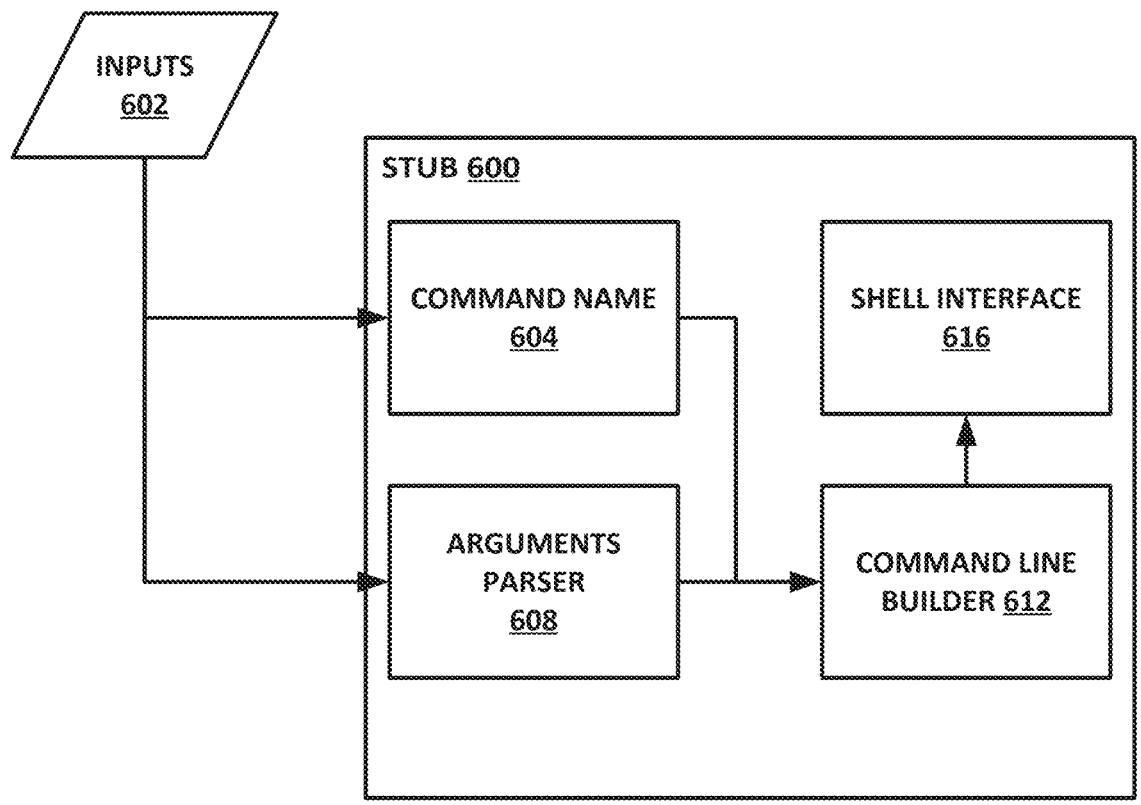
FIG. 6 is a block diagram of selected elements of an RPC stub.

FIG. 6 is a block diagram of selected elements of a stub 600. Stub 600 could be a stub on the RPC server side or on the RPC client side. For purposes of illustration, an RPC server stub is illustrated is shown here.

Stub 600 receives input 602. Input 602 may include a command name 604 and arguments which are provided to an arguments parser 608. Based on the name of the command or commands and arguments parsed by arguments parser 608, command line builder 612 may build or concatenate an appropriate command line to be issued to the shell. In some cases, this may include parameterizing arguments to ensure that a shell injection attack cannot occur. Command line builder 612 may then provide the command line with arguments to a shell interface 616. Shell interface 616 may execute the command, including optionally piping or redirecting output to a location on disk or in memory where the output may be accessible to the RPC service so that data can be returned to the RPC requester.

Figure 7:
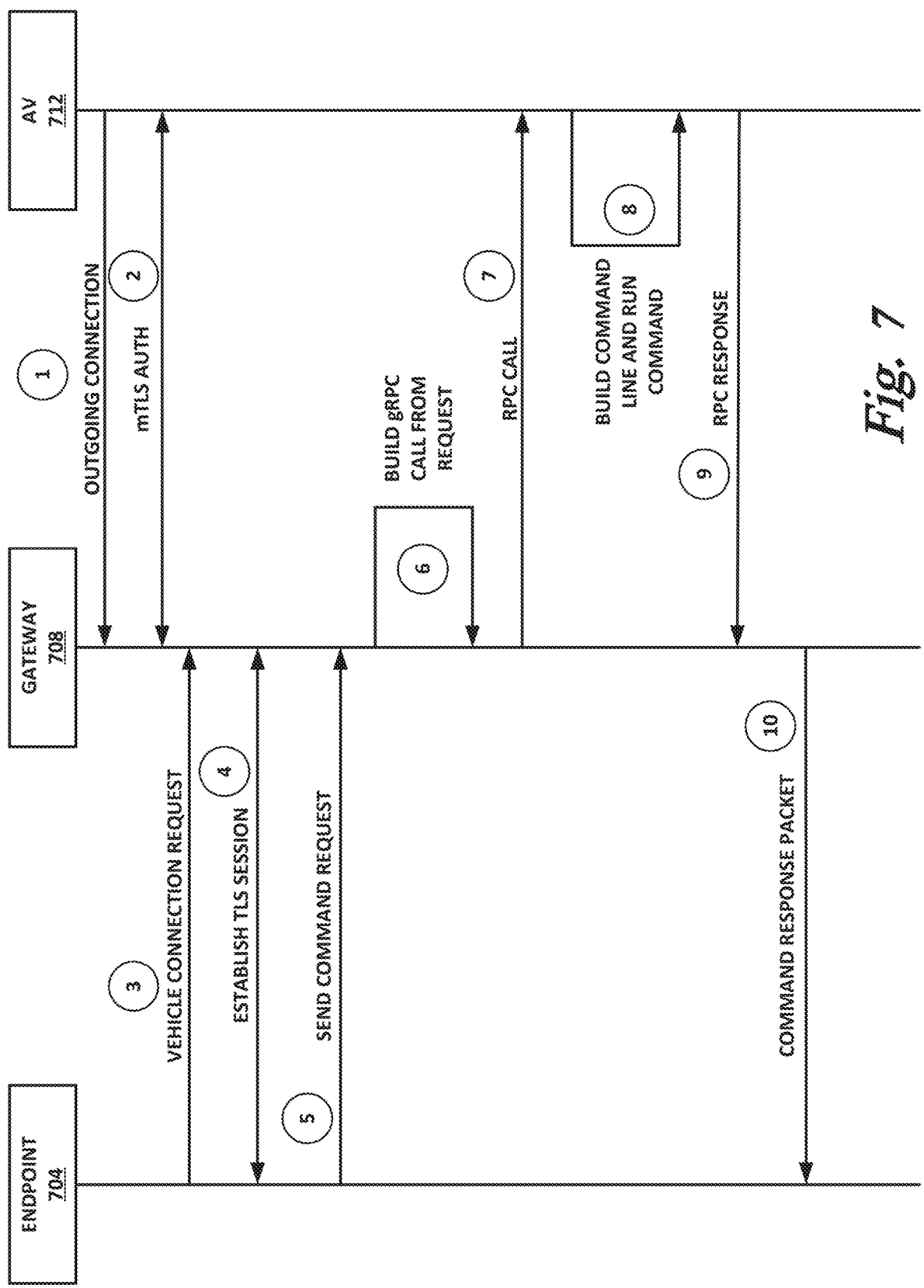
FIG. 7 is a signal flow diagram that illustrates selected aspects of a gRPC request.

FIG. 7 is a signal flow diagram that illustrates selected aspects of a gRPC request.

The signal flow diagram of FIG. 7 illustrates communication between an endpoint device 704, a gateway 708, and an AV 712.

In an example, at operation 1, AV 712 may connect to an appropriate network, such as Wi-Fi network in a garage, and make an outgoing connection to gateway 708. At operation 2, AV 712 and gateway 708 may perform an MTLS authentication. This enables gateway 708 and AV 712 to authenticate one another and ensure that each device is what it claims to be. Once the MTLS authentication is complete, then AV 712 may be in a condition to accept RPC request from gateway 708.

At operation 3, endpoint 704 makes a vehicle connection request to gateway 708. This vehicle connection request may be a request to connect to a particular AV in the fleet and may also be a request to connect to a particular vehicle controller in the case where multiple redundant vehicle controllers are provided on the vehicle.

In operation 4, endpoint 704 and gateway 708 perform TLS authentication wherein gateway 708 provides a certificate to endpoint 704. Once endpoint 704 has authenticated gateway 708, the two devices may exchange symmetric encryption keys that can be used to encrypt traffic for the duration of the TLS session.

In operation 5, endpoint 704 sends a command request to gateway 708. The command request includes a command to execute and optionally arguments to append to the command.

In operation 6, gateway 708 marshals parameters and builds an RPC call from the command request supplied by endpoint 704.

In operation 7, gateway 708 issues the RPC call to AV 712.

In operation 8, AV 712 marshals parameters and, within the appropriate stub, builds the command line including appropriate arguments. AV 712 may then cause the appropriate command to be run on one or more vehicle controllers of AV 712.

In operation 9, once the command has completed, then AV 712 provides an RPC response to gateway 708.

Gateway 708 may receive the RPC response and, in operation 10, build a response packet including the output of the requested command. In operation 10, gateway 708 provides the command response to endpoint 704. Endpoint 704 may then provide appropriate activity, such as displaying the output, logging the output, or taking some other action.

Figure 8:
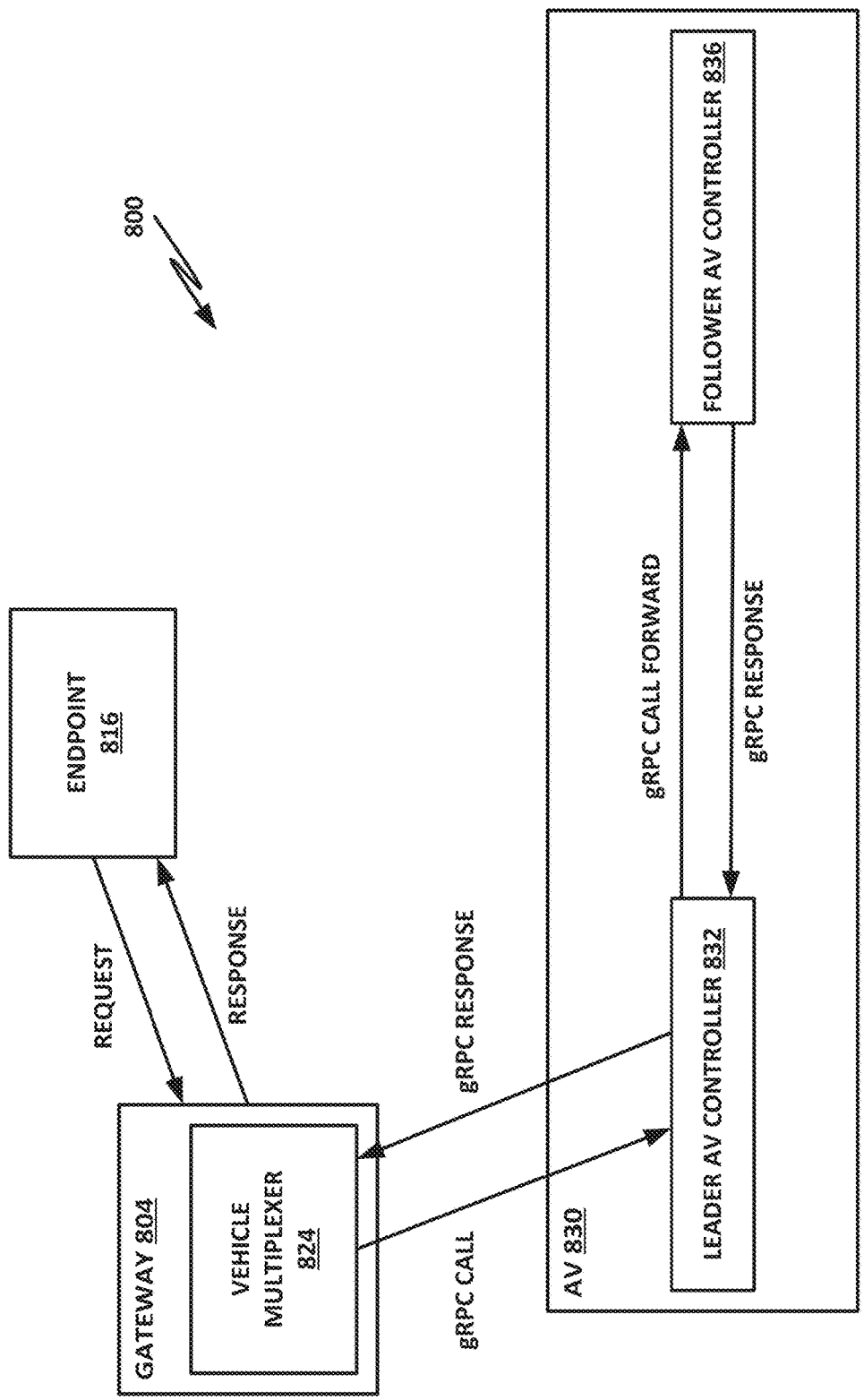
FIG. 8 block diagram of additional selected elements of an AV ecosystem.

FIG. 8 is a block diagram of additional selected elements of an AV ecosystem 800. AV ecosystem 800 illustrates certain aspects of the use of leader and follower controllers. In particular, AV 830 may be provided with a leader AV controller 832. Leader AV controller 832 may be the main or primary AV controller. Additional AV controllers, such as follower AV controller 836, may be provided for purposes of safety and redundancy. For example, if leader AV controller 832 fails, one or more follower AV controllers 836 may take over certain functions of the vehicle.

As in previous illustrations, an endpoint 816 communicates with a gateway 804, which includes a vehicle multiplexer 824 that communicatively couples to AV 830 when AV 830 is available. Endpoint 816 may issue a command request to gateway 804, and gateway 804 may operate vehicle multiplexer 824 to connect to the correct AV 830. Gateway 804 provides a gRPC call to leader AV controller 832 of AV 830. However, in this example, the gRPC call may not be directed to leader AV controller 832 but may instead be directed to follower AV controller 836.

Follower AV controller 836 could implement the entire gRPC API, but this may be unnecessary as the gRPC API explicitly provides commands that reference followers. Thus, leader AV controller 832 may provide a gRPC call forward message to follower AV controller 836. Follower AV controller 836 may then process the gRPC call forward message as it would an gRPC message. For example, follower controller 836 may run a command on its local shell and then provide a gRPC response back to leader AV controller 832.

Leader AV controller 832 may forward the gRPC response to gateway 804, which may then provide a response to endpoint 816.

Other embodiments could provide different mechanisms for handling messages. For example, gateway 804 could include a queue with a "decorated" message that says which service it's intended for. Gateway 804 could then pass the message along to the daemon process within AV 830. However, this would change the format of the message on the existing queue. It may also require that producers on the queue know how to form new messages. This may require extra producers on the queue since the daemon API clients and remote-command clients would both use it. This may also result in many messages or slow processing of messages of one type which may cause requests of all types to be delayed.

Another alternative is for the vehicle daemon to receive and pass messages along to the correct service on itself. This may be implemented, for example, by having a proxy GRP service on the daemon that proxies different services. This may require maintaining a third gRPC API that stays in sync with both remote commands as well as gRPC adapter APIs.

Thus, in at least some embodiments, the use of gRPC forwarding may realize substantial advantages over alternative entitlements.

FIG. 9 is a block diagram 900 illustrating an illustrative lifecycle of an autonomous vehicle.

During development and debugging, the autonomous vehicle may start out as a development vehicle 904. Development vehicle 904 may have a vehicle controller that provides remote shell access to a system programmer. This may be used in block 908 to develop and debug the software ecosystem with SSH enabled.

In block 912, when development and debug or complete, the model may be prepared for production. This may include moving both development vehicle 904 into a production mode, as well as manufacturing additional vehicles of the same model and specifications with the same configuration.

In block 916, before the vehicle is prepared for production, SSH may be disabled to ensure that unrestricted remote shell access is not available while the vehicle is operating as a production vehicle.

In block 920, the vehicle may be certified for production. For example, certain hardware may be digitally signed and certain software configurations may also be digitally signed. The vehicle's production status may remain valid only so long as those digital signatures remain valid, or in other words, only so long as those hardware and software components have not been compromised or modified. Thus, once the vehicle is certified for production, production vehicle 924 has a known configuration that may not be easily changed.

If it is later required to perform additional testing, maintenance, repair, or other work on production vehicle 924 that requires changing the certified hardware and/or software, in block 928, the vehicle may be unlocked for development. Once the vehicle is unlocked for development, it may be returned to its status as a development vehicle 904 with SSH enabled and the ability to change hardware and software configurations.

In some embodiments, it may be desirable to ensure that it is not easy to frequently switch between development vehicle 904 and production vehicle 924. A production vehicle 924 may be intended to be a relatively static configuration that should not change frequently.

Figure 10A:
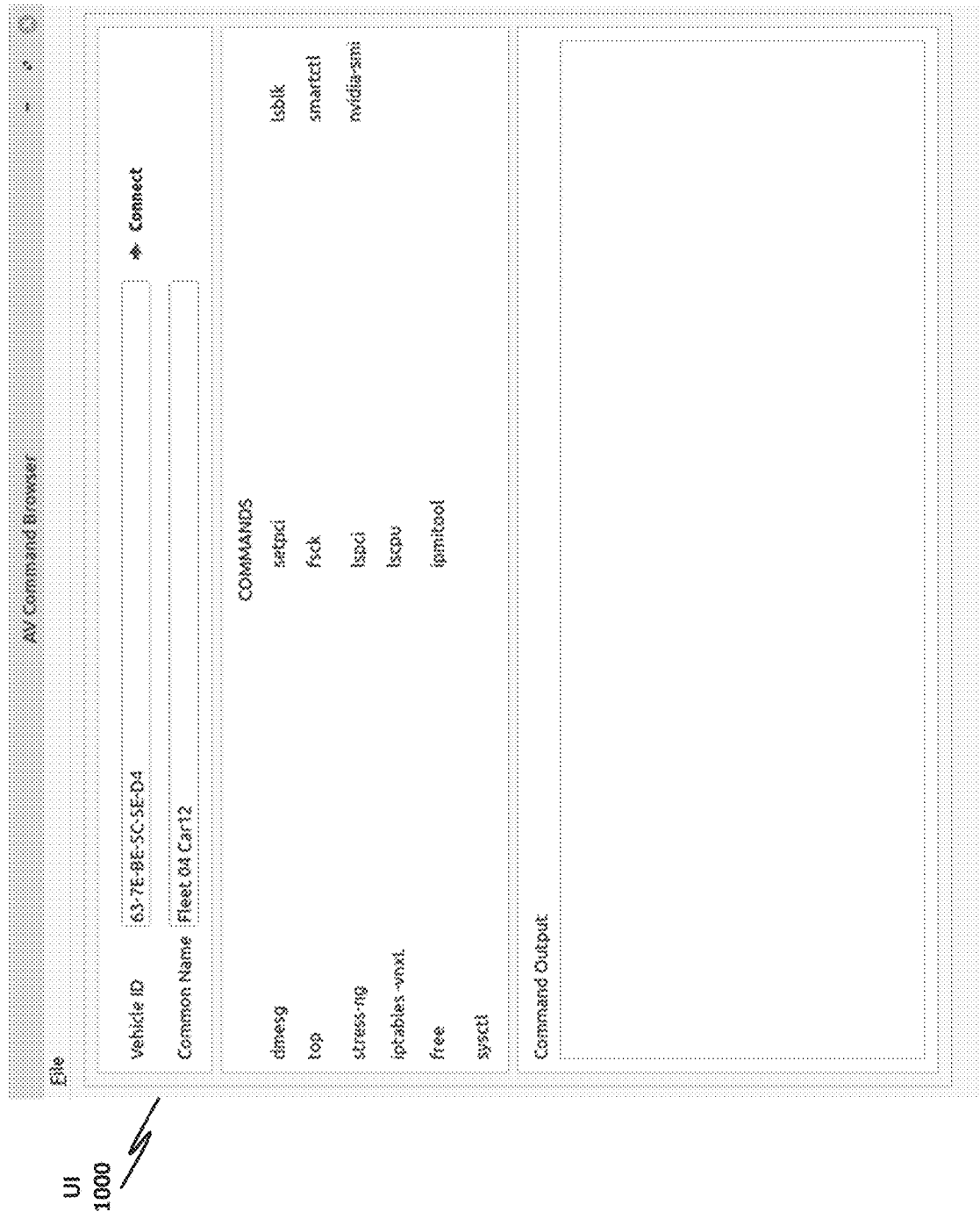
FIGS. 10A and 10B provide a block diagram illustration of selected elements an example graphical user interface.
Figure 10B:
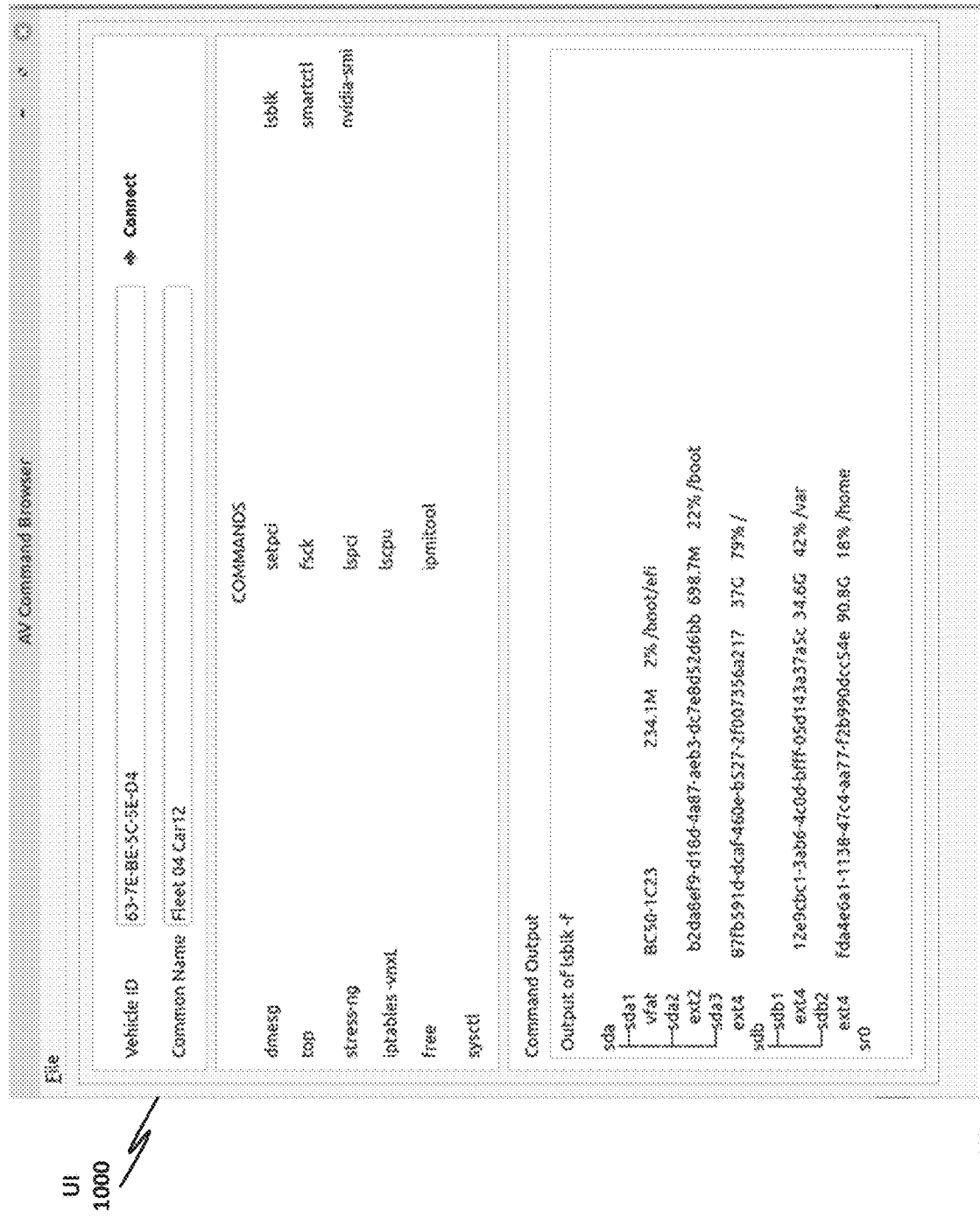

FIGS. 10A and 10B illustrate an illustrative user interface 1000 that may be used to issue command requests to an anonymous vehicle or autonomous vehicle controller.

UI 100 may include an interface to connect to a selected vehicle, such as via a vehicle ID that could be a media access control (MAC) or MAC-like address, an IPv6 address, or other identifier that connects to the vehicle. The UI may also display a common or friendly name for the vehicle, such as an identification of the car number and fleet that the car belongs to. The user may also have the option to select a particular controller that the user wishes to connect to, such as the leader AV controller or one or more follower AV controllers.

In this illustrative embodiment, the user may be provided with a plurality of individual pushbuttons that send specific commands to the AV controller. For example, if the user wants to list block devices on the controller, the user may click on the button for the lsblk command. This may cause the gateway to send a gRPC request to the selected device to run the lsblk command. In some cases, the user may be provided with a pop-up that prompts the user to select which controller on the AV to send the command to and may also be provided an opportunity to issue certain command line arguments, although the command line arguments may be limited to only selected command line arguments from among all the arguments available for the selected command.

FIG. 10B illustrates that after the technician has issued the lsblk command, a command output may be provided, such as the output of the command lsblk-f. In this case, the user is provided with a listing of block devices on the vehicle controller along with the file system status for each device as intended.

Figure 11:
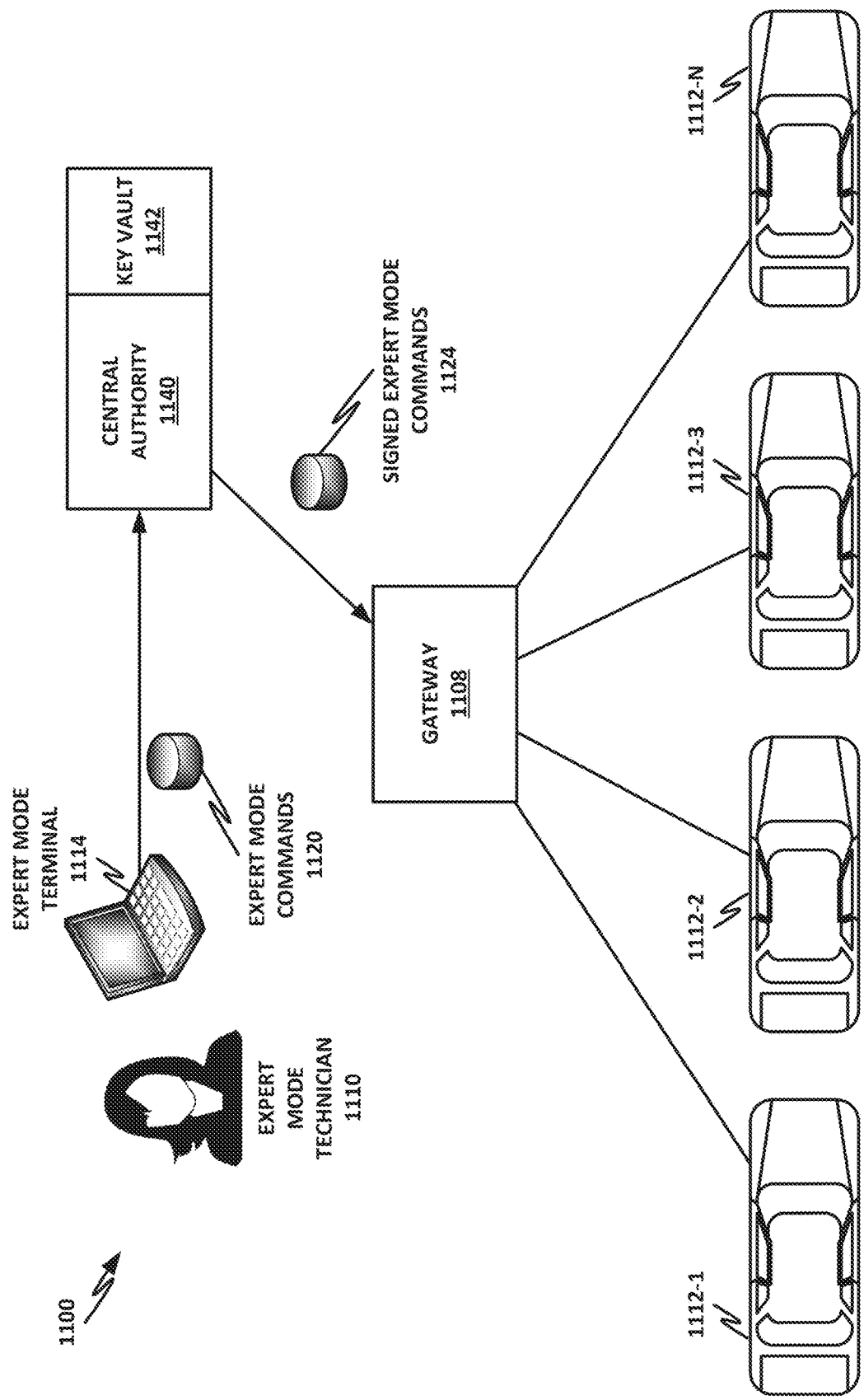
FIG. 11 is a block diagram of selected elements of an additional AV ecosystem.

FIG. 11 is a block diagram of selected elements of an additional AV ecosystem 1100. AV ecosystem 1100 illustrates additional logic that may be provided in the case of an expert mode technician issuing expert mode commands to autonomous vehicles. Specifically, expert mode technician 1110 may operate in expert mode terminal 1114 to issue expert mode commands 1120. In this case, expert mode commands 1120 may not be directed straight to gateway 1108 but may first be provided to a central authority 1140. Central authority 1140 may perform in an mTLS authentication with expert mode terminal 1114. Once central authority 1140 has certified expert mode terminal 1114, then central authority 1140 may receive expert mode commands 1120 from expert mode terminal 1114. Central authority 1140 may operate a key vault 1142, which may be, for example, an electronic key vault. Electronic key vault 1142 may maintain a master key or root key that is used to sign expert mode commands 1120. In some embodiments, expert mode commands 1120 may be routed through central authority 1140, which signs expert mode commands to provide signed expert mode commands 1124. Signed expert mode commands 1124 are then provided to gateway 1108, which may provide the signed expert mode commands to a selected AV, such as one of AV 1112-1, 1112-2, 1112-3 through 1112-N. AV 1112 may then use the public key of central authority 1140 to verify the commands and may reject any command that is not verified.

In some cases, rather than routing all commands through central authority 1140, central authority may provision a derived certificate to expert mode terminal 1114. This derived certificate may have a relatively short lifespan and allows expert mode terminal 1114 to sign expert mode commands so that they will be run on AVs 1112.

Figure 12:
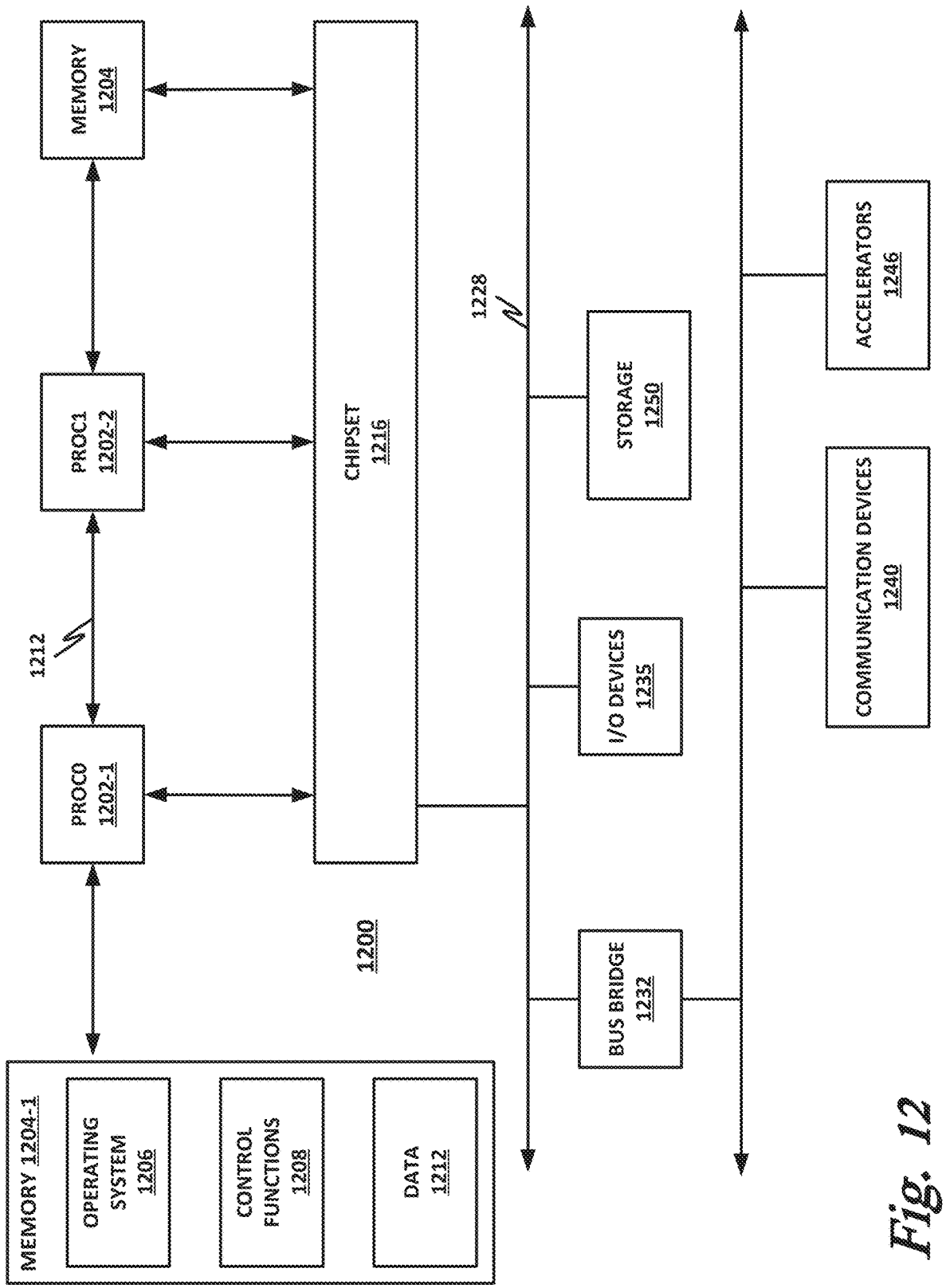
FIG. 12 is a block diagram of selected elements of a hardware platform.

FIG. 12 is a block diagram of a hardware platform 1200. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Hardware platform 1200 may provide a suitable structure for controller 104 of FIG. 1, as well as for other computing elements illustrated throughout this specification, including elements external to AV QA02, such as gateway 308 of FIG. 3. Depending on the embodiment, elements of hardware platform 1200 may be omitted, and other elements may be included.

Hardware platform 1200 is configured to provide a computing device. In various embodiments, a "computing device" may be or comprise, by way of nonlimiting example, a computer, system on a chip (SoC), workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 1200 is arranged in a point-to-point (PtP) configuration. This PtP configuration is popular for personal computer (PC) and server-type devices, although it is not so limited, and any other bus type may be used. The PtP configuration may be an internal device bus that is separate from CAN bus QA70 of FIGURE QA, although in some embodiments they may interconnect with one another.

Hardware platform 1200 is an example of a platform that may be used to implement embodiments of the teachings of this specification. For example, instructions could be stored in storage 1250. Instructions could also be transmitted to the hardware platform in an ethereal form, such as via a network interface, or retrieved from another source via any suitable interconnect. Once received (from any source), the instructions may be loaded into memory 1204, and may then be executed by one or more processor 1202 to provide elements such as an operating system 1206, operational agents 1208, or data 1212.

Hardware platform 1200 may include several processors 1202. For simplicity and clarity, only processors PROC0 1202-1 and PROC1 1202-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 1202 may be any type of processor and may communicatively couple to chipset 1216 via, for example, PtP interfaces. Chipset 1216 may also exchange data with other elements. In alternative embodiments, any or all of the PtP links illustrated in FIG. 12 could be implemented as any type of bus, or other configuration rather than a PtP link. In various embodiments, chipset 1216 may reside on the same die or package as a processor 1202 or on one or more different dies or packages. Each chipset may support any suitable number of processors 1202. A chipset 1216 (which may be a chipset, uncore, Northbridge, Southbridge, or other suitable logic and circuitry) may also include one or more controllers to couple other components to one or more central processor units (CPU).

Two memories, 1204-1 and 1204-2 are shown, connected to PROC0 1202-1 and PROC1 1202-2, respectively. As an example, each processor is shown connected to its memory in a direct memory access (DMA) configuration, though other memory architectures are possible, including ones in which memory 1204 communicates with a processor 1202 via a bus. For example, some memories may be connected via a system bus, or in a data center, memory may be accessible in a remote DMA (RDMA) configuration.

Memory 1204 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 1204 may be used for short, medium, and/or long-term storage. Memory 1204 may store any suitable data or information utilized by platform logic. In some embodiments, memory 1204 may also comprise storage for instructions that may be executed by the cores of processors 1202 or other processing elements (e.g., logic resident on chipsets 1216) to provide functionality.

In certain embodiments, memory 1204 may comprise a relatively low-latency volatile main memory, while storage 1250 may comprise a relatively higher-latency nonvolatile memory. However, memory 1204 and storage 1250 need not be physically separate devices, and in some examples may simply represent a logical separation of function (if there is any separation at all). It should also be noted that although DMA is disclosed by way of nonlimiting example, DMA is not the only protocol consistent with this specification, and that other memory architectures are available.

Certain computing devices provide main memory 1204 and storage 1250, for example, in a single physical memory device, and in other cases, memory 1204 and/or storage 1250 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Chipset 1216 may be in communication with a bus 1228 via an interface circuit. Bus 1228 may have one or more devices that communicate over it, such as a bus bridge 1232, I/O devices 1235, accelerators 1246, communication devices 1240, and a keyboard and/or mouse 1238, by way of nonlimiting example. In general terms, the elements of hardware platform 1200 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 1240 can broadly include any communication not covered by a network interface and the various I/O devices described herein. This may include, for example, various universal serial bus (USB), FireWire, Lightning, or other serial or parallel devices that provide communications. In a particular example, communication device 1240 may be used to stream and/or receive data within a CAN. For some use cases, data may be streamed using UDP, which is unidirectional and lacks error correction. UDP may be appropriate for cases where latency and overhead are at a higher premium than error correction. If bi-directional and/or error corrected communication are desired, then a different protocol, such as TCP may be preferred.

I/O Devices 1235 may be configured to interface with any auxiliary device that connects to hardware platform 1200 but that is not necessarily a part of the core architecture of hardware platform 1200. A peripheral may be operable to provide extended functionality to hardware platform 1200 and may or may not be wholly dependent on hardware platform 1200. In some cases, a peripheral may itself be a. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

Bus bridge 1232 may be in communication with other devices such as a keyboard/mouse 1238 (or other input devices such as a touch screen, trackball, etc.), communication devices 1240 (such as modems, network interface devices, peripheral interfaces such as PCI or PCIe, or other types of communication devices that may communicate through a network), audio I/O 1242, a data storage device 1244, and/or accelerators 1246. In alternative embodiments, any portions of the bus architectures could be implemented with one or more PtP links.

Operating system 1206 may be, for example, Microsoft Windows, Linux, UNIX, Mac OS X, IOS, MS-DOS, or an embedded or real-time operating system (including embedded or real-time flavors of the foregoing). For real-time systems such as an AV, various forms of QNX are popular. In some embodiments, a hardware platform 1200 may function as a host platform for one or more guest systems that invoke application (e.g., operational agents 1208).

Operational agents 1208 may include one or more computing engines that may include one or more nontransitory computer-readable mediums having stored thereon executable instructions operable to instruct a processor to provide operational functions. At an appropriate time, such as upon booting hardware platform 1200 or upon a command from operating system 1206 or a user or security administrator, a processor 1202 may retrieve a copy of the operational agent (or software portions thereof) from storage 1250 and load it into memory 1204. Processor 1202 may then iteratively execute the instructions of operational agents 1208 to provide the desired methods or functions.

SELECTED EXAMPLES

There is disclosed in an example, an autonomous vehicle (AV), comprising: a vehicle motive system comprising hardware to operate the AV; and an AV controller to autonomously or semi-autonomously control the vehicle motive system, the AV controller comprising a hardware platform comprising a processor circuit and a memory, and instructions encoded within the memory to: provide a Linux or Unix-based operating system (OS), including a utility set comprising a plurality of OS utility commands; provide a remote procedure call (RPC) server to accept incoming RPC requests from a host outside the AV; provide RPC stubs for a set of whitelisted commands, wherein the whitelisted commands comprise a subset of utility commands permissible to run on an AV with a production status; receive an incoming RPC request via the RPC server; map the incoming RPC request to a whitelisted command; and provide the RPC request to an RPC stub for the whitelisted command.

There is further disclosed an example wherein the RPC server is a gRPC server.

There is further disclosed an example wherein the OS utility commands comprise standard GNU utilities.

There is further disclosed an example wherein the OS utility commands comprise standard POSIX utilities.

There is further disclosed an example wherein the whitelisted commands comprise exclusively read-only commands.

There is further disclosed an example wherein the whitelisted commands comprise exclusively read-only versions of the OS utility commands.

There is further disclosed an example wherein the whitelisted command comprise exclusively commands or versions of commands unable to alter the production status.

There is further disclosed an example wherein the whitelisted commands comprise a subset including fewer than all of the OS utility commands.

There is further disclosed an example wherein the OS includes a remote shell server, and wherein the remote shell server is disabled.

There is further disclosed an example wherein the RPC server is to receive command line arguments for the whitelisted commands, and parameterize the command line arguments.

There is further disclosed an example wherein the RPC server is to identify a target AV controller selected from among a plurality of AV controllers of the AV, and forward the RPC request to the selected AV controller.

There is further disclosed an example wherein the selected AV controller is a follower controller.

There is further disclosed an example of a method of maintaining device security within a control computer of an AV, comprising: receiving a command request for execution on the control computer; verifying that the command request is directed to a command that is on a list of commands permitted on the control computer; if the command is on the list, converting the command request to a remote procedure call (RPC) request, comprising marshalling parameters from the command request and calling an RPC stub associated with the command, wherein the RPC request is directed to the control computer; receiving an RPC response from the control computer, the RPC response comprising output of the command; and providing a response to the command request, wherein the response to the command request comprises the RPC response.

There is further disclosed an example, further comprising receiving an incoming connection from the control computer, and identifying the control computer as available if the incoming connection is made via an authorized network.

There is further disclosed an example wherein the authorized network is a wireless network of a service facility for the AV.

There is further disclosed an example, further comprising determining that the AV is not available, and returning an error message as the response to the command request.

There is further disclosed an example of a system for servicing an autonomous vehicle (AV), comprising: an autonomous vehicle (AV), comprising an AV controller with software to provide shell commands, and a remote procedure call (RPC) server comprising stubs to encapsulate a whitelisted subset of the shell commands; a gateway comprising a hardware platform and software to provide an RPC client and a web-based service including a user interface to: receive a command request from a remote user, connect to the AV controller, convert the command request to an RPC call, send the RPC call to the AV controller, receive an RPC response from the AV controller; and provide a response to the command request; wherein the response to the command request is based at least in part on the RPC response.

There is further disclosed an example wherein the RPC server and client are a gRPC server and client.

There is further disclosed an example wherein the whitelisted subset comprises exclusively read-only shell commands.

There is further disclosed an example wherein the whitelisted subset comprises exclusively read-only versions of the shell commands.

There is further disclosed an example of an AV, comprising a vehicle motive system comprising hardware to operate the AV; and an AV controller to autonomously or semi-autonomously control the vehicle motive system, the AV controller comprising a hardware platform comprising a processor circuit and a memory, and instructions encoded within the memory to: provide an operating system (OS), including a utility set comprising a plurality of OS utility commands; provide a remote procedure server to accept incoming remote procedure requests from a host outside the AV; provide remote procedure stubs for a set of whitelisted commands, wherein the whitelisted commands comprise a subset of utility commands permissible to run on an AV with a production status; receive an incoming remote procedure request via the remote procedure server; map the incoming remote procedure request to a whitelisted command; and provide the remote procedure request to a remote procedure stub for the whitelisted command.

There is further disclosed an example, wherein the remote procedure server is an RPC server.

There is further disclosed an example, wherein the RPC server is a gRPC server.

There is further disclosed an example, wherein the OS is a Linux or Unix OS.

There is further disclosed an example, wherein the OS utility commands comprise POSIX or GNU utilities.

There is further disclosed an example, wherein the whitelisted commands comprise exclusively read-only commands.

There is further disclosed an example, wherein the whitelisted commands comprise exclusively read-only versions of the OS utility commands.

There is further disclosed an example, wherein the whitelisted commands comprise a subset including fewer than all of the OS utility commands.

There is further disclosed an example, wherein the OS includes a remote shell server, and wherein the remote shell server is disabled.

There is further disclosed an example, wherein the remote procedure server is to receive command line arguments for the whitelisted commands, and parameterize the command line arguments.

There is further disclosed an example, wherein the AV controller is one of a plurality of AV controllers, and wherein the remote procedure server is to identify a target AV controller selected from among a plurality of AV controllers of the AV, wherein the AV controllers are of a same species as, and forward the RPC request to the selected AV controller.

There is further disclosed an example, wherein the selected AV controller is a follower controller.

There is further disclosed an example of a method of maintaining device security within a control computer of an autonomous vehicle (AV), comprising: receiving a command request for execution on the control computer; verifying that the command request is directed to a command that is on a list of commands permitted on the control computer; if the command is on the list, converting the command request to a remote procedure request, comprising marshalling parameters from the command request and calling a stub associated with the command, wherein the remote procedure request is directed to the control computer; receiving remote procedure response from the control computer, the remote procedure response comprising output of the command; and providing a response to the command request, wherein the response to the command request comprises the remote procedure response.

There is further disclosed an example, wherein the remote procedure request and remote procedure response are a gRPC request and response.

There is further disclosed an example, further comprising receiving an incoming connection from the control computer, and identifying the control computer as available if the incoming connection is made via an authorized network.

There is further disclosed an example, wherein the authorized network is a wireless network of a service facility for the AV.

There is further disclosed an example of a system for servicing an autonomous vehicle (AV), comprising: an AV, comprising an AV controller with software to provide shell commands, and a remote procedure server comprising stubs to encapsulate a whitelisted subset of the shell commands; a gateway comprising a hardware platform and software to provide a remote procedure client and a web-based service including a user interface to: receive a command request from a remote user, connect to the AV controller, convert the command request to an remote procedure call, send the remote procedure call to the AV controller, receive an remote procedure response from the AV controller; and provide a response to the command request; wherein the response to the command request is based at least in part on the remote procedure response.

There is further disclosed an example, wherein the remote procedure server and client are a gRPC server and client.

There is further disclosed an example, wherein the whitelisted subset comprises exclusively read-only shell commands.

There is further disclosed an example, wherein the whitelisted subset comprises exclusively read-only versions of the shell commands.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes).

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." In at least some cases, a "circuit" may include both the physical hardware of the circuit, plus any hardware or firmware that programs or configures the circuit. For example, a network circuit may include the physical network interface circuitry, as well as the logic (software and firmware) that provides the functions of a network stack.

Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The foregoing detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The "means for" in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. An autonomous vehicle (AV), comprising:
    a vehicle motive system comprising hardware to operate the AV; and
    an AV controller to autonomously or semi-autonomously control the vehicle motive system, the AV controller comprising a hardware platform comprising a processor circuit and a memory, and instructions encoded within the memory to:
        provide an operating system (OS), including a utility set comprising a plurality of OS utility commands;
        provide a remote procedure server to accept incoming remote procedure requests from a host outside the AV;
        provide remote procedure stubs for a set of whitelisted commands, wherein the whitelisted commands comprise a subset of utility commands permissible to run on an AV with a production status;
        receive an incoming remote procedure request via the remote procedure server; map the incoming remote procedure request to a whitelisted command; and
        provide the remote procedure request to a remote procedure stub for the whitelisted command.

2. The AV of claim 1, wherein the remote procedure server is an RPC server.

3. The AV of claim 2, wherein the RPC server is a gRPC server.

4. The AV of claim 1, wherein the OS is a Linux or Unix OS.

5. The AV of claim 1, wherein the OS utility commands comprise POSIX or GNU utilities.

6. The AV of claim 1, wherein the whitelisted commands comprise exclusively read-only commands.

7. The AV of claim 1, wherein the whitelisted commands comprise exclusively read-only versions of the OS utility commands.

8. The AV of claim 1, wherein the whitelisted commands comprise a subset including fewer than all of the OS utility commands.

9. The AV of claim 1, wherein the OS includes a remote shell server, and wherein the remote shell server is disabled.

10. The AV of claim 1, wherein the remote procedure server is to receive command line arguments for the whitelisted commands, and parameterize the command line arguments.

11. The AV of claim 1, wherein the AV controller is one of a plurality of AV controllers, and wherein the remote procedure server is to identify a target AV controller selected from among a plurality of AV controllers of the AV and forward the remote procedure request to the selected AV controller.

12. The AV of claim 11, wherein the selected AV controller is a follower controller.

13. A method of maintaining device security within a control computer of an autonomous vehicle (AV), comprising:
    receiving a command request for execution on the control computer;
    verifying that the command request is directed to a command that is on a list of commands permitted on the control computer;

if the command is on the list, converting the command request to a remote procedure request, comprising marshalling parameters from the command request and calling a stub associated with the command, wherein the remote procedure request is directed to the control computer;

receiving remote procedure response from the control computer, the remote procedure response comprising output of the command; and providing a response to the command request, wherein the response to the command request comprises the remote procedure response.

14. The method of claim 13, wherein the remote procedure request and remote procedure response are a gRPC request and response.

15. The method of claim 13, further comprising receiving an incoming connection from the control computer, and identifying the control computer as available if the incoming connection is made via an authorized network.

16. The method of claim 15, wherein the authorized network is a wireless network of a service facility for the AV.

17. A system for servicing an autonomous vehicle (AV), comprising:

an AV, comprising an AV controller with software to provide shell commands, and a remote procedure server comprising stubs to encapsulate a whitelisted subset of the shell commands;

a gateway comprising a hardware platform and software to provide a remote procedure client and a web-based service including a user interface to:

receive a command request from a remote user, connect to the AV controller, convert the command request to a remote procedure call, send the remote procedure call to the AV controller, receive a remote procedure response from the AV controller; and provide a response to the command request, wherein the response to the command request is based at least in part on the remote procedure response.

18. The system of claim 17, wherein the remote procedure server and client are a gRPC server and client.

19. The system of claim 17, wherein the whitelisted subset comprises exclusively read-only shell commands.

20. The system of claim 17, wherein the whitelisted subset comprises exclusively read-only versions of the shell commands.

* * * * *